(12) United States Patent
Fujihana

(10) Patent No.: US 7,375,150 B2
(45) Date of Patent: May 20, 2008

(54) ANTI-STATIC COMPOSITION AND METHOD FOR PRODUCTION THEREOF

(75) Inventor: Noriaki Fujihana, Ashiya (JP)

(73) Assignee: Sanko Chemical Industry Co., Ltd., Senboku (JP)

( * ) Notice: Subject to any disclaimer, the term of this patent is extended or adjusted under 35 U.S.C. 154(b) by 70 days.

(21) Appl. No.: 10/485,150

(22) PCT Filed: May 1, 2002

(86) PCT No.: PCT/JP02/04379

§ 371 (c)(1),
(2), (4) Date: Jan. 29, 2004

(87) PCT Pub. No.: WO03/011973

PCT Pub. Date: Feb. 13, 2003

(65) Prior Publication Data

US 2004/0175573 A1 Sep. 9, 2004

(30) Foreign Application Priority Data

Jul. 30, 2001 (JP) .............................. 2001-229137
Aug. 30, 2001 (JP) .............................. 2001-262201

(51) Int. Cl.
G03C 1/85 (2006.01)
G03C 1/89 (2006.01)

(52) U.S. Cl. ............... 524/167; 524/436; 524/437; 524/450; 524/910; 528/44; 528/48; 528/55; 528/56; 528/57; 528/67; 528/75; 528/69; 430/527; 430/523; 430/495.1; 427/372.2; 427/384

(58) Field of Classification Search .......... 524/167, 524/436, 437, 450, 910; 528/44, 48, 55, 528/56, 57, 67, 75, 69; 430/527, 523, 495.1; 427/373.2, 384
See application file for complete search history.

(56) References Cited

U.S. PATENT DOCUMENTS 5,478,877 A * 12/1995 Komatsu et al. ............ 524/401
5,508,107 A * 4/1996 Gutman et al. ............. 428/339
5,626,981 A * 5/1997 Simon et al. ............... 429/105
6,093,451 A    7/2000 Sandlin et al.
6,140,405 A   10/2000 Eckstein et al.
6,159,638 A * 12/2000 Takatera et al. ............ 429/309

FOREIGN PATENT DOCUMENTS

| EP | 0 494 331 A | 7/1992 |
|---|---|---|
| JP | 62-050344 A | 3/1987 |
| JP | 63-033435 A | 2/1988 |
| JP | 06-049303 | 2/1994 |
| TW | 247906 | 5/1995 |
| WO | WO 93/21212 | 10/1993 |
| WO | WO 97/35929 | 10/1997 |
| WO | WO 99/02611 | 1/1999 |

OTHER PUBLICATIONS

Office Action from Taiwanese Patent Office for Application No. 91109143 dated Jan. 6, 2004.
Office Action from Japanese Patent Office for Application No. 2000-339657 mailed Aug. 24, 2004.
JPO Office Action for Japanese Application JP2001-229137 dated Nov. 8, 2005.
JPO Office Action for Japanese Application JP2001-262201 dated Nov. 8, 2005.
Communication Report dated Aug. 2, 2006, issued in corresponding European Application No. 02 72 4671.

* cited by examiner

*Primary Examiner*—Sanza L. McClendon
(74) *Attorney, Agent, or Firm*—Westerman, Hattori, Daniels & Adrian, LLP.

(57) ABSTRACT

An antistatic composition that is excellent in thermo stability, is free from the problem of bleeding-out, exhibits its effect independently of humidity, has immediate effectiveness, and also exhibits excellent and persistent antistatic properties, and a method for producing the composition are provided. The antistatic composition comprises a predetermined alkali metal salt or alkaline earth metal salt, and resin.

16 Claims, No Drawings

ANTI-STATIC COMPOSITION AND METHOD FOR PRODUCTION THEREOF

TECHNICAL FIELD

The present invention relates to an antistatic composition excellent in electric resistivity, and to a method for producing the composition.

BACKGROUND ART

In recent years, problems concerning electrostatic have been paid attention to. Such problems include the charging of the surface of a molding of plastic, glass, or the like, which causes contamination of the surface by, for example, dust, or failure or breaking-down of ICs and LSIs due to voltage with high electrostatic, or malfunction of electronic equipment due to electromagnetic noises. In view of this, it has become important to impart antistatic properties to resin.

Known methods for imparting antistatic properties to resin include coating of an antistatic agent such as a surface active agent on the resin surface, and mixing of an antistatic agent into resin. The method for coating an antistatic agent on the resin surface, however, has the problem of lacking in practical usability as an antistatic resin with persistency because antistatic properties decrease significantly after a long period. On the other hand, the problem with the method for mixing an antistatic agent into resin is that because of poor compatibility between antistatic agents and resin, the antistatic agent bleeds out on the surface of the molding, thus decreasing an antistatic effect. In addition, such problems exist that because of the humidity dependent properties of antistatic agents such as surface active agents, their antistatic effect may be deactivated under low humidity, or it may require at least 1 to 3 days to exhibit their antistatic effect after forming the resin, thus causing a delayed action.

In addition, a method for mixing carbon black or carbon fiber into resin is proposed. This method, however, has such problems that a transparent molding cannot be obtained and that the choice of color for a molding is limited.

Japanese Unexamined Patent Publication Nos. 64-9258 and 2-255852, aiming to overcome the problems of poor compatibility between antistatic agents and resin and of their poor dispersivility in vinyl chloride resin, disclose antistatic agents that utilize perchlorate such as ammonium perchlorate and lithium perchlorate. In addition, an antistatic composition that contains polyamide resin, polyether esteramide resin, aliphatic polyester, polylactic resin, thermoplastic elastomer and unvulcanized rubber, and alkali metal salt or alkaline earth metal salt is proposed (International Publication No. WO 01/79354A1). The above perchlorate, however, has the problem of impairing the thermo stability of vinyl chloride. In addition, sufficient antistatic properties may not be obtained depending on the kind of metal salt used for the antistatic composition. Furthermore, there are such drawbacks in utilizing perchlorate that when wrapping metal with the obtained film or sheet, the metal surface may corrode, rust, or be contaminated. In addition, when alkali metal salt is dissolved in polymerizable monomer, this polymerizable monomer is heated at the time of dissolution. This starts the polymerization of the monomer and thus may not realize a uniform surface coat layer. On the other hand, when alkali metal salt such as lithium perchlorate is dissolved in alcohol or an ethers solvent, the alkali metal salt gives off heat so intensely when dissolved that it may be impossible to control the heating. This presents the problem of not being applicable industrially.

As a method for imparting electric resistivity to polyolefin resin, a method for adding hydrophilic resin is proposed (by, e.g., Japanese Unexamined Patent Publication Nos. 4-198308 and 7-126446). This method, however, requires the hydrophilic resin to be added at more than 10 percent by weight of the polyolefin resin in order for the resin to exhibit practically sufficient antistatic properties. This presents the problem of impairing the physical properties of the substrate resin; for example, the strength of a molding decreases. In addition, when humidity is low, moisture on the resin surface decreases and so does antistatic properties resulting from moisture, presenting the problem of significantly impairing antistatic properties.

In addition, Japanese Unexamined Patent Publication No. 9-227743 discloses a transparent antistatic composition in which vinyl chloride resin, plasticizer, and lithium bis(trifluoromethanesulfonyl)imide are blended. However, the blended amount of the lithium bis(trifluoromethanesulfonyl) imide is large with respect to the vinyl chloride resin, and this deteriorates thermo stability; when heated at 120° C. for 30 minutes, the composition becomes blackish brown, thus presenting the problem of losing transparency and antistatic properties.

DISCLOSURE OF THE INVENTION

In view of the foregoing and other problems in the prior art, it is an object of the present invention to provide a composition that is excellent in electric resistivity and maintains the electric resistivity, and a method for producing the composition.

All of the embodiments are based on the same or similar concepts. However, because each of the embodiments has been realized by different examples, the embodiments have been divided into a first invention group, a second invention group, a third invention group, and a fourth invention group by grouping together those embodiments that are closely related. In the following, the details of each section (invention group) are described in order.

(1) First Invention Group

In a first invention group, there is provided an antistatic composition comprising: at least one compound selected from the group consisting of lithium bis(trifluoromethanesulfonyl)imide and lithium tris(trifluoromethanesulfonyl) methide; and polyurethane.

With this construction, it is possible to obtain polyurethane excellent in antistatic properties without impairing the general physical properties of the polyurethane. The polyurethane according to the present invention is excellent in, as well as antistatic properties, thermal resistance stability, is free from dependence on environment and the problem of bleeding out, and can be easily colored.

The at least one compound selected from the group consisting of lithium bis(trifluoromethanesulfonyl)imide and lithium tris(trifluoromethanesulfonyl)methide may be added at 0.01 to 20 percent by weight of the polyurethane material.

If the ratio of the added compound is less than 0.01 percent by weight, antistatic properties are not exhibited sufficiently. On the other hand, if the ratio of the added compound exceeds 20 percent by weight, the effect to impart antistatic properties to the polyurethane becomes saturated, presenting the problem of causing cost increase.

The antistatic polyurethane according to the present invention may be produced as follows. When producing the polyurethane by the reaction of polyol having at least two activated hydrogen atoms with isocyanate, the at least one compound selected from the group consisting of lithium bis(trifluoromethanesulfonyl)imide and lithium tris(trifluoromethanesulfonyl)methide is added.

In the above production method, the adding of the at least one compound selected from the group consisting of lithium bis(trifluoromethanesulfonyl)imide and lithium tris(trifluoromethanesulfonyl)methide may be such that the compound is dissolved in the polyol. Since a compound that is able to impart antistatic properties is dissolved in the polyol, it is possible to produce polyurethane with uniform antistatic properties.

In the above production method, a solution in which the at least one compound selected from the group consisting of lithium bis(trifluoromethanesulfonyl)imide and lithium tris(trifluoromethanesulfonyl)methide is dissolved in water or an organic solvent at 0.1 to 90 percent by weight thereof may be added in the polyol. It is also possible to produce polyurethane with uniform antistatic properties by dissolving the compound in a solvent that is capable of dissolving it. Note that if the dissolved concentration is less than 0.1 percent by weight, the antistatic properties of the obtained polyurethane may not be uniform. On the other hand, if the dissolved concentration exceeds 90 percent by weight, there arises the problem of causing cost increase.

(2) Second Invention Group

In a second invention group, there is provided an antistatic composition comprising: (A) at least one substance selected from the group consisting of a compound including moiety of an ether bond and/or moiety of an ester bond, and (co-)polymer including moiety of an ether bond; and (3) an anion adsorption processing substance obtained by processing alkali metal salt or alkaline earth metal salt by treating a compound having anionic adsorbability.

With this construction, it is possible to provide a film or a sheet with which, when wrapping metal, there is no corrosion, rust, or contamination on the metal surface, even if metal salt such as lithium perchlorate and sodium perchlorate is used for the antistatic composition.

The compound including moiety of an ether bond and/or an ester bond may be a compound (C) including a group represented by the following general formula (1):

—O(AO)$_n$—                                                   (1)

where A represents an alkylene group of 2 to 4 carbons and n represents an integer of 1 to 7.

The (co-)polymer including moiety of an ether bond may be at least one (co-)polymer selected from the group consisting of polyalkylene oxide resin and polyurethane resin.

The metal salt may be at least one lithium salt selected from the group consisting of lithium perchloride, trifluoromethanesulfonic acid lithium, lithium bis(trifluoromethanesulfonyl)imide, and lithium tris(trifluoromethanesulfonyl)methide. The above lithium salt imparts excellent antistatic properties to resin.

The compound having anionic adsorbability may be at least one selected from the group consisting of synthetic hydrotalcite composed of magnesium and aluminum in major proportion, and an anion exchanger. Since a compound having anionic adsorbability adsorbs anions originating from metal salt, there is no corrosion, contamination, or rust on the metal surface.

The antistatic composition according to the present invention group can be produced by adding alkali metal salt or alkaline earth metal salt in at least one selected from the group consisting of a compound including moiety of an ether bond and/or moiety of an ester bond, and (co-)polymer including moiety of an ether bond, and by further adding a compound having anionic adsorbability.

It is also possible to produce the antistatic composition according to the present invention group by adding alkali metal salt or alkaline earth metal salt and a compound having anionic adsorbability in at least one selected from the group consisting of a compound including moiety of an ether bond and/or moiety of an ester bond, and (co-)polymer including moiety of an ether bond (2) Third Invention Group In a third invention group, there is provided an antistatic composition for a coating material comprising at least one compound selected from the group consisting of lithium bis(trifluoromethanesulfonyl)imide, lithium tris(trifluoromethanesulfonyl)methide, and trifluoromethanesulfonic acid lithium.

With this construction, since lithium is included as an organic metal compound in the resin composition, it is possible to obtain an antistatic composition for a coating material that is excellent in solubility with respect to the resin composition and that has lithium ions uniformly dispersed in the composition. In addition, since a substance like perchlorate is not used, when applied on the metal surface, the occurrence of corrosion, contamination, or rust on the metal surface is prevented.

In the above antistatic composition for a coating material, the at least one compound selected from the group consisting of lithium bis(trifluoromethanesulfonyl)imide, lithium tris(trifluoromethanesulfonyl)methide, and trifluoromethanesulfonic acid lithium may be included at 0.05 to 10.0 parts by weight of 100 parts by weight of a coating layer forming component included in the antistatic composition for a coating material.

If the ratio of the added lithium salt is less than 0.05 part by weight, antistatic properties are not exhibited sufficiently. On the other hand, if the ratio of the added lithium salt exceeds 10.0 parts by weight, the effect to impart antistatic properties becomes saturated, presenting the problem of causing cost increase.

Note that the coating-layer forming component used in the present specification denotes resin composing the composition of the present invention and pigment, if desired, added in the composition.

The antistatic composition for a coating material according to the present invention group can be produced by dissolving at least one compound selected from the group consisting of lithium bis(trifluoromethanesulfonyl)imide, lithium tris(trifluoromethanesulfonyl)methide, and trifluoromethanesulfonic acid lithium in water, organic solvent, polymerizable monomer, prepolymer, or oligomer, and by adding the solution in a composition for a coating material.

The above lithium compounds are dissolved in any of the above solvents. Therefore, in producing the composition for a coating material, a solution in which uniform dissolution is realized is added, making it possible to obtain a composition for a coating material capable of imparting uniform antistatic properties. In addition, since heating is not necessary when dissolving the compound in the polymerizable monomer or the like, polymerization does not start at the time of preparation. Furthermore, the lithium compounds do not give off heat when dissolved in alcohol or an ether solvent.

In a molding on which a surface coat layer made of the antistatic composition for a coating material is formed, the surface coat layer may have antistatic properties.

Methods for imparting antistatic properties to a molding of synthetic resin include a method for forming a molding from antistatic resin. However, the place where the occurrence of electrostatic becomes a problem is the surface of an object. That is, not necessarily the entire molding is made of an antistatic substance. Therefore, as in the present invention, it is possible to easily impart antistatic properties to a molding by forming an antistatic surface coat layer on the surface of the molding.

The use of the antistatic resin composition for a coating material of the present invention realizes antistatic moldings and antistatic films or antistatic sheets, when the composition is coated on various moldings and films or sheets. These can be utilized as, for example, carrier tapes for electronic parts such as ICs, condensers, transistors, or LSIs, or as containers called carrier trays. In addition, the surface coat layer can be transparent or have any colors.

(2) Fourth Invention Group

In a fourth invention group, there is provided an antistatic composition comprising a combination of a compound (D), lithium salt (E), and a compound (F), the compound (D) being at least one compound selected from the group consisting of alkyl amide or an alkylene oxide adduct of alkylene amide represented by the following formula (2), and alkyl amine or an alkylene oxide adduct of alkylene amine represented by the following formula (3), the lithium salt (E) being at least one lithium salt selected from the group consisting of lithium bis(trifluoromethanesulfonyl)imide, lithium tris(trifluoromethanesulfonyl)methide, and trifluoromethanesulfonic acid lithium, and the compound (F) being at least one compound selected from the group consisting of polymerizable monomer, prepolymer, oligomer, and polymer:

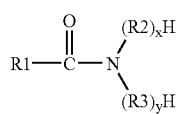

(2)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50; and

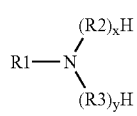

(3)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50.

With this construction, antistatic properties are exhibited by the at least one compound (D) selected from the group consisting of alkyl amide or an alkylene oxide adduct of alkylene amide represented by the above formula (2), and alkyl amine or an alkylene oxide adduct of alkylene amine represented by the above formula (3), and the at least one lithium salt (E) selected from the group consisting of lithium bis(trifluoromethanesulfonyl)imide, lithium tris(trifluoromethanesulfonyl)methide, and trifluoromethanesulfonic acid lithium, based on the function of each of the compound and the lithium salt. Therefore, it is possible to obtain an antistatic composition that is excellent in heat stability, is free from bleeding-out, is independent of humidity, has immediate effectiveness, and has persistent and excellent antistatic properties.

The at least one compound (D) selected from the group consisting of alkyl amide or an alkylene oxide adduct of alkylene amide represented by the above formula (2), and alkyl amine or an alkylene oxide adduct of alkylene amine represented by the above formula (3), and the at least one lithium salt (E) selected from the group consisting of lithium bis(trifluoromethanesulfonyl)imide, lithium tris(trifluoromethanesulfonyl)methide, and trifluoromethanesulfonic acid lithium have excellent compatibility with resin and therefore are free from bleeding-out.

The existence of alkyl amide or an alkylene oxide adduct of alkylene amide, or of alkyl amine or an alkylene oxide adduct of alkylene amine makes it possible for lithium ions in the lithium compound to move within the molding, upon application of a voltage. Specifically, an ionic conduction passage is formed by the oxyalkylene group contained in alkyl amide or an alkylene oxide adduct of alkylene amide, or in alkyl amine or an alkylene oxide adduct of alkylene amine. Through this ionic conduction passage the lithium ions can move within the molding. This results in an increase in the ionic conductivity of the composition so that an electric antistatic effect is exhibited. Thus, an antistatic composition excellent in immediate effectiveness is obtained.

Under an atmosphere of high humidity, alkyl amide or an alkylene oxide adduct of alkylene amide, or alkyl amine or an alkylene oxide adduct of alkylene amine represented by the above formula (3) exhibits an electric antistatic effect. Under an atmosphere of low humidity, the lithium salt exhibits an electric antistatic effect. As a result, an antistatic composition that exhibits an electric antistatic effect that is independent of humidity is obtained.

Note that alkyl amide or an alkylene oxide adduct of alkylene amide, or alkyl amine or an alkylene oxide adduct of alkylene amine forms a thin film on a molding without bleeding out and exhibits an electric antistatic effect. Even if the thin film is removed because of an atmosphere of low humidity or by washing, these substances exude gradually out of the molding to form another thin film. This makes it possible to maintain excellent antistatic properties.

Alkyl amide or an alkylene oxide adduct of alkylene amide, or alkyl amine or an alkylene oxide adduct of alkylene amine, and the above lithium salt are transparent, making it possible to obtain a transparent antistatic composition.

The antistatic composition of the present invention group exhibits antistatic properties because of alkyl amide or an alkylene oxide adduct of alkylene amide, or alkyl amine or an alkylene oxide adduct of alkylene amine, and the lithium salt. This results in a decrease in the amount of the lithium salt blended in the composition, making it possible to obtain an antistatic composition that is excellent in thermo stability, transparency, and antistatic properties.

In the above antistatic composition, alkyl amide or an alkylene oxide adduct of alkylene amide represented by the above formula (2) may be polyoxyethylene alkyl amide, polyoxyethylene alkylene amide, polyoxypropylene alkyl amide, or polyoxypropylene alkylene amide, and alkyl amine or an alkylene oxide adduct of alkylene amine represented by the above formula (3) may be polyoxyethylene alkyl amine, polyoxyethylene alkylene amine, polyoxypropylene alkyl amine, or polyoxypropylene alkylene amine.

When oxyethylene or oxypropylene is used as the oxyalkylene group, the structure of the oxyethylene or oxypropylene imparts a hydrophilic property to the compounds represented by the above formulae (2) and (3). Therefore, more of the above effect is exhibited under an atmosphere of high humidity.

In the above antistatic composition, the lithium salt (E) may be blended at 0.1 to 50 percent by weight of the at least one compound (D) selected from the group consisting of alkyl amide or an alkylene oxide adduct of alkylene amide represented by the above formula (2), and alkyl amine or an alkylene oxide adduct of alkylene amine represented by the above formula (3).

If the ratio of the added lithium salt is less than 0.05 part by weight, antistatic properties begin to depend on humidity and may not be exhibited sufficiently under an atmosphere of low humidity. On the other hand, if the ratio of the added lithium salt exceeds 5.0 parts by weight, the effect to impart antistatic properties becomes saturated, presenting the problem of causing cost increase.

In the above antistatic composition, a total (D+E) of the compound (D) and the lithium salt (E) may be included at 0.05 to 10.0 parts by weight of 100 parts by weight of the resin compound (F) of the resin, the compound (D) being at least one compound selected from the group consisting of alkyl amide or an alkylene oxide adduct of alkylene amide represented by the above formula (2), and alkyl amine or an alkylene oxide adduct of alkylene amine represented by the above formula (3).

If the mixture ratio of the antistatic agents is less than 0.05 part by weight, antistatic properties may not be exhibited sufficiently because of the small amount of the mixture. On the other hand, if the mixture ratio exceeds 10.0 parts by weight, the effect to impart antistatic properties becomes saturated, presenting the problem of causing cost increase.

The antistatic composition according to the present invention group can be produced by dissolving the lithium salt (E) in the compound (D) and by adding the solution in the compound (F), the lithium salt (E) being at least one lithium salt selected from the group consisting of lithium bis(trifluoromethanesulfonyl)imide, lithium tris(trifluoromethanesulfonyl)methide, and trifluoromethanesulfonic acid lithium, the compound (D) being at least one compound selected from the group consisting of alkyl amide or an alkylene oxide adduct of alkylene amide represented by the above formula (2), and alkyl amine or an alkylene oxide adduct of alkylene amine represented by the above formula (3), and the compound (F) being at least one compound selected from the group consisting of polymerizable monomer, prepolymer, oligomer, and polymer.

The above lithium compound dissolves in the at least one compound (D) selected from the group consisting of alkyl amide or an alkylene oxide adduct of alkylene amide represented by the above formula (2), and alkyl amine or an alkylene oxide adduct of alkylene amine represented by the above formula (3). Therefore, the two antistatic substances are uniformly mixed. These uniformly mixed agents are added in the compound (F) selected from the group consisting of polymerizable monomer, prepolymer, oligomer, and polymer, making it possible to obtain an antistatic composition in which the two antistatic agents are uniformly dispersed.

BEST MODE FOR CARRYING OUT THE INVENTION (1) Examples of a First Invention Group The first invention group according to the present invention will be described below.

Embodiment 1

The material components and methods for obtaining polyurethane used in the present invention are those known in the art, except those for obtaining the at least one compound selected from the group consisting of lithium bis(trifluoromethanesulfonyl)imide and lithium tris(trifluoromethanesulfonyl)methide.

Polyurethane is generally made by the reaction of diisocyanate and polyol. The polyol used in the present invention should have at least two activated hydrogen atoms in the molecules thereof. Specifically, examples of such polyol include polyether polyol such as ethyleneoxide adducts and propyleneoxide adducts such as polyprene glycol, glycerol, trimethylol propane, and sorbitol; polyester polyol obtained by the reaction of acid such as adipic acid, succinic acid, maleic acid, and phthalic acid, with glycol such as ethylene glycol and butylene glycol; and polybutadiene polyol. Examples of low-molecular polyol include 1,4-butanediol, ethylene glycol, propylene glycol, butylene glycol, and diethylene glycol. Particularly, polyether polyol, polyether polyol, and polytetramethylene ether glycol are preferable.

Examples of the isocyanate used in the present invention include, for example, tolylene diisocyanate, diphenylenemethane diisocyanate, hexamethylene diisocyanate, and prepolymer whose end has the above isocyanate.

Into the polyurethane material according to the present invention, catalyst, foaming agent, foaming stabilizer, chain extender, crosslinking agent, or fire retardant, e.g., amine compounds, quaternary ammonium salt compounds, polymer containing a quaternary ammonium base, or organometallic compounds may be added.

Furthermore, pigment may be added. The mixture of pigment makes it easier to color the obtained antistatic polyurethane. Examples of usable pigment include inorganic pigment such as talc, titanium oxide, red iron oxide, clay, silica white, and calcium carbonate, and organic pigment such as azo pigment, phthalocyane pigment, and carbon black pigment.

The antistatic composition according to the present invention can be produced as follows. When polyurethane is produced by reacting polyol having at least two activated hydrogen atoms with isocyanate, the at least one compound selected from the group consisting of lithium bis(trifluoromethanesulfonyl)imide and lithium tris(trifluoromethanesulfonyl)methide is added.

The above compound may be added by dissolving the compound in the polyol. Examples of the polyol capable of dissolving the above compound include, for example, low-molecular polyol such as monoethylene glycol, diethylene glycol, and 1,4-butanediol; polyether polyol and polyester polyol.

Note that when utilizing this method, another polyol may be contained in addition to the above polyol that dissolves the above compound. The solution to be added is preferably that in which at least one compound selected from the group consisting of lithium bis(trifluoromethanesulfonyl)imide and lithium tris(trifluoromethanesulfonyl)methide is dissolved at 0.1 to 90 percent by weight of the polyol having at least two activated hydrogen atoms.

The at least one compound selected from the group consisting of lithium bis(trifluoromethanesulfonyl)imide and lithium tris(trifluoromethanesulfonyl)methide may be added at 0.01 to 20 percent by weight of the polyurethane material, as mentioned above.

The antistatic polyurethane obtained in the present invention can be used for polyurethane foam of hard foam and soft foam; crosslinking or thermoplastic polyurethane elastomer; reactive injection molding polyurethane; synthetic fiber formed of a long-chain polymeric substance having 85 percent by weight of segmented polyurethane; and polyurethane coating material, all of which requiring high antistatic properties.

EXAMPLE 1

The present invention will be now described in detail based on, but not limited to, an example.

Note that "part" and "parts" in each example respectively denote "part by weight" and "parts by weight," "lithium imide" denotes "lithium bis (trifluoromethanesulfonyl)imide," and "lithium methane" denotes "lithium tris(trifluoromethanesulfonyl)methide."

EXAMPLE 1-1

Eight parts ethylene glycol in which 5 percent by weight lithium imide (available from Sumitomo 3M Ltd.) was dissolved, 0.5 part water, 0.4 part triethylenediamine, and 1.0 part silicone surface active agent (brand name: SH-193, available from Toray Co. Ltd.) were added in 100 parts polyethylene adipate (hydroxyl group (OHV): 56), and mixed. Thus, a preparation was obtained. Into this preparation, 100 parts mixture of diphenylmethane diisocyanate and polyethylene adipate having the moiety of isocyanate ends (mixture ratio 9:1) was mixed, stirred, and allowed to react. Thus, a polyurethane solution was obtained. This solution was left to stand. Thus, a plate-like specimen A1 of 4.5 mm thick was obtained.

EXAMPLE 1-2

4.5 parts water, 0.1 part pentamethylene triamine, and 2.0 parts silicone surface active agent (brand name: Silicone Oil L-520, available from UCC) were added in a mixture of 90 parts propylene glycol polyether polyol (brand name: Actcall MN-3050BM, available from Mitsui Takeda Chemicals, Inc.; hydroxyl group (OHV): 56) and 10 parts propylene glycol polyether polyol (hydroxyl group (OHV): 56) in which 10 percent by weight lithium imide (available from Sumitomo 3M Ltd.) was dissolved, and then mixed. Thus, a preparation was obtained Into this preparation, 56 parts tolylene diisocyanate was mixed, stirred, and allowed to react. Thus, a good-quality soft urethane foam A2 with 48 pieces of foam per cubic inch was obtained

EXAMPLE 1-3

3.6 parts water, 0.1 part pentamethylene triamine, 2.0 parts silicone surface active agent (brand name: Silicone Oil L520, available from UCC), 0.3 part stannous octoate serving as catalyst, and 13 parts Freon-11 serving as Flon blowing agent were added in 100 parts polyether polyol (hydroxyl group (OHV): 56; average molecular weight: 2000) synthesized from adipic acid in which 5 percent by weight lithium methane was dissolved and 1,4-butanediol, and then mixed. Thus, a preparation was obtained. Into this preparation, 56 parts tolylene diisocyanate was mixed, stirred, and allowed to react. Thus, a good-quality soft urethane foam A3 was obtained.

EXAMPLE 1-4

Polyurethane prepolymer for r.t. curing type and polytetramethylene glycol propylene glycol polyether polyol in which 2 percent by weight lithium imide was dissolved were prepared so that NCO group/OH group=1.15, and then mixed. Into this mixture, 1 percent by weight stannous octoate was added as catalyst. Next, this mixture was applied on a polyether film (50 µm thick), and left to stand and cured. Thus, film-like transparent resin A4 of 0.2 mm thick was obtained

EXAMPLE 1-5

100 parts glycerol polyoxypropylene triol (hydroxyl group (OHV): 56; average molecular weight: 5000) in which 2 percent by weight lithium imide was dissolved, 6.03 parts tolylene diisocyanate, 4 parts silicone surface active agent, 0.035 part dibutyltin dilaurate, and 0.03 part tetracyanoethylene were stirred and mixed mechanically into the form of foam with dry air. This mixture was poured into a cylindrical-shaped mold with an internal diameter of 16.5 mm and a length of 210 mm, and heated for one hour at 120° C. After the mixture was cured, it was taken out of the mold. Thus, a hard foam A5 was obtained.

EXAMPLE 1-6

A coating material was prepared by mixing 150 parts hydrogenated 1,2-polybutadiene polyol (GI-1000, available from Mitsubishi Chemical Corporation), 65 parts trimethylol propane adduct (Takenate D-140N, available from Takeda Chemical Industries, Ltd.) of isophorone diisocyanate, 26 parts caprolactam adduct O405-80T, available from Asahi Chemical Industry Co., Ltd.) of hexamethylene diisocyanate, 10 parts polyethylene methacrylate copolymer (Reox AS-170, available from Dai-Ichi Kogyo Seiyaku Co., Ltd.) containing a quaternary ammonium base, 10 parts lithium imide, and 65 parts mixture solvent of toluene-methanol (70:30). This coating material was applied on a rubber sheet of 1 mm thick by a spray method to form a surface coat layer of 30 µm thick. This surface coat layer was heated and dried for one hour at 120° C. and thus the film was cured. Thus, a covering layer A6 was prepared.

EXAMPLE 1-7

A mixture solution was prepared by mixing 25 parts sorbitol polyol (hydroxyl group (OHV): 450) in which 4 percent by weight lithium imide was dissolved, 75 parts pentaery thritol polyol (hydroxyl group (OHV): 450), 0.15 part pentamethyl diethylenetriamine, 1.5 parts silicone surface active agent, and 15 parts HCFC-141b. Into this mixture solution, 118 parts tolylene diisocyanate prepolymer (NCO group: 30 percent) was added and stirred Thus, a good-quality hard polyurethane foam A7 was obtained.

EXAMPLE 1-8

A viscous mixture was prepared by mixing 4,4-diphenylmethane diisocyanate and polytetramethylene glycol (average molecular weight: 1000) in which 10 parts 1,4-dimethylol benzene was added so that NCO group/OH group=1.05.

The 1,4-dimethylol benzene was that in which 50 percent by weight lithium imide was dissolved. This mixture was heated for six hours at 120° C. Thus, thermoplastic elastomer was obtained. The obtained elastomer was cut into a pellet-like shape of about 5 mm in diameter. Thus cut elastomer was subjected to press working. Thus, a sheet-like specimen A8 of about 5 mm thick was obtained.

Comparative Example 1-1

A plate-like specimen X1 was prepared in the same manner as Example 1-1 except that 8 parts ethylene glycol in which 5 percent by weight n-lauryl trimethyl ammonium chloride was dissolved instead of lithium imide was added.

Comparative Example 1-2

Film-like transparent resin was obtained in the same manner as Example 1-4 except that propylene glycol polyether polyol without lithium imide dissolved therein was used. On the surface of this film, methanol in which 10 percent by weight 2-ethylhexyl ammonium nitrate was dissolved was applied by spray and dried Thus, film-like transparent resin X2 was obtained.

Comparative Example 1-3

A plate-like specimen X3 was prepared in the same manner as Example 1-1 except that 8 parts ethylene glycol in which 5 percent by weight lithium perchlorate was dissolved instead of lithium imide was added.

Comparative Example 1-4

Although lithium perchlorate, instead of lithium imide as in Example 1-7, was meant to be dissolved in sorbitol polyol, it wasn't dissolved, failing to obtain a hard polyurethane foam.

(Test 1)

The surface resistivity (volume resistivity for A5) of Examples A1 to A8 and Comparative Examples X1 to X3 were measured, the results of which are listed in Table 1. Examples A1, A4, and Comparative Example X2 were left to stand under a stream of water for 30 minutes and then dried, after which their surface resistivity was measured again. The results are also listed in Table 1.

Note that the measuring of the surface resistivity and volume resistivity of the present Examples and Comparative Examples was performed in accordance with JIS K 6911, using a URS probe (Hiresta UP, made by Mitsubishi Petrochemical Co., Ltd.) and a ring electrode (Urutra Megohm Meter SM-8218 and SM-8301, made by Toa Electronics Ltd.). In this measuring, applied voltages were 100 volts and 500 volts (for volume resistivity).

Furthermore, a strength retention rate was measured with respect to Example A1 and Comparative Example X3, the results of which are also listed in Table 1.

The measuring of the strength retention rate was performed after an accelarated wet-heat test under a condition of high temperature and humidity, i.e., at a temperature of 80° C. and a relative humidity of 95 percent.

TABLE 1

| Specimens in Examples/Comparative Examples | Lithium (weight %) In polyol | Lithium (weight %) In polyurethane | Specific resistivity (Ω/sq.) | Specific resistivity (Ω/sq.) | Strength retention rate (%) |
|---|---|---|---|---|---|
| A1 | 5 | 0.19 | $7 \times 10^8$ | $7.5 \times 10^8$ | 90 |
| A2 | 10 | 0.64 | $9 \times 10^7$ | — | — |
| A3 | 5 | 3.2 | $5 \times 10^6$ | — | — |
| A4 | 2 | 1 | $8 \times 10^7$ | — | — |
| A5 | 2 | 1.8 | $4 \times 10^7$ | — | — |
| A6 | 10 *1 | 3.8 | $9 \times 10^6$ | — | — |
| A7 | 4 | 1 | $8 \times 10^7$ | — | — |
| A8 | 50 | 5 | $1 \times 10^7$ | — | — |
| X1 | — | — | $5 \times 10^{10}$ | — | — |
| X2 | — | — | $6 \times 10^8$ | $9 \times 10^{10}$ | — |
| X3 | — | — | $3 \times 10^{10}$ | — | 60 |

* 1: Percentage of lithium in a mixture solvent of toluene-methanol.

Table 1 shows that the surface resistivity of Examples A1 to A4, A6 to A8, and Comparative Example X2 were lower than those of Comparative Examples X1 and X2. The volume resistivity of Example A5 was also low. On the other hand, as clearly seen from Example A1 and Comparative Example X2, the surface resistivity of the article of the present Example was kept low even after the underwater test. As a result, it has been found that antistatic properties are retained.

In addition, as clearly seen from Example A1 and Comparative Example X3, it has been found that the present invention is excellent in a strength retention rate after the accelarated wet-heat test.

(2) Examples of a Second Invention Group

Embodiment 2

<Component (A)>

A component (A) used in the present invention is at least one selected from the group consisting of a compound including moiety of an ether bond and/or moiety of an ester bond and (co-)polymer including moiety of an ether bond. Such compound improves the solubility of metal salt used for a component (B) and stabilizes the metal salt in the composition of the present invention group.

The compound including moiety of an ether bond and/or moiety of an ester bond include a compound (C) including a group represented by the following general formula (1):

$$\text{—O(AO)}_n\text{—} \tag{1}$$

where A represents an alkylene group of 2 to 4 carbons and n represents an integer of 1 to 7.

The above compound (A) increases solubility and dissociation stability in a composition of the metal salt in the composition of the present invention group.

The above compound (C) can be produced by a common production method of an ester compound using raw material of a hydroxyl compound obtained by adding 1 to 7 moles of alkylene oxide with 2 to 4 carbons and dibasic acid in 1 mole of branched aliphatic alcohol.

The hydroxyl compound that can be used is not particularly limited; however, examples thereof include, for example, hydroxyl compounds in which 1 to 7 moles of ethylene oxide, 1 to 4 moles of propylene oxide, or 1 to 3 moles of butylene oxide is added in 1 mole of propanol; hydroxyl compounds in which 1 to 6 moles of ethylene oxide or 1 to 3 moles of propylene oxide is added in 1 mole of butanol; hydroxyl compounds in which 1 to 2 moles of ethylene oxide is added in 1 mole of hexanol; hydroxyl compounds in which 1 to 5 moles of ethylene oxide, 1 to 3 moles of propylene oxide, or 1 to 2 moles of butylene oxide is added in 1 mole of pentanol; hydroxyl compounds in which 1 to 5 moles of ethylene oxide, 1 to 2 moles of propylene oxide, or 1 to 3 moles of butylene oxide is added in 1 mole of octanol; and hydroxyl compounds in which 1 to 4 moles of ethylene oxide, 1 to 2 moles of propylene oxide, or 1 to 2 moles of butylene oxide is added in 1 mole of nonanol.

Preferable hydroxyl compounds among the foregoing hydroxyl compounds are 2-(2-butoxyethoxy)ethanol in which 2 moles of ethylene oxide is added in 1 mole of butanol, and 2-butoxy ethanol in which 1 mole of ethylene oxide is added in 1 mole of butanol. These are suitable for processing a composition.

Examples of the above dibasic acid include carboxylic acid such as adipic acid, sebacic acid, phthalic acid, and succinic acid, and carboxylic acid anhydride thereof.

Examples of preferable compound (C) include bis[2-(2-butoxyethoxy)ethyl]adipate, bis(2-butoxyethyl)phthalates, and the like.

Examples of the compound including moiety of an ether bond and/or an ester bond include, for example, polymerizable monomer, prepolymer, and oligomer that include moiety of an ether bond and/or moiety of an ester bond. Specific examples of the polymerizable monomer, prepolymer, and oligomer include those of polyethylene glycol di(meth)acrylate such as ethylene glycol di(meth)acrylate, diethylene glycol(meth)acrylate, dipropylene glycol di(meth)acrylate, triethylene glycol di(meth)acrylate, tripropylene glycol di(meth)acrylate, trimethylol propane ethoxy (meth)acrylate, trimethylol propane tri(meth)acrylate, neopentyl glycol di(meth)acrylate, tetraethylene glycol di(meth) acrylate, and ethoxy diethylene glycol(meth)acrylate, and polypropylene glycol(meth)acrylate. In addition, examples of the compound include polypropylene glycol, polyether polyol such as polymer polyol polytetramethylene glycol, adipate polyol, phthalate polyol, polycaprolactam polyol, polyester polyol such as polycarbonate polyol, polybutadiene polyol, and acrylic polyol.

In the present invention group, the compound including moiety of an ether bond and/or moiety of an ester bond can be used as it is, or in the form of a solution in which the compound is dissolved in a solvent.

Examples of the (co-)polymer including moiety of an ether bond used in the present invention group include, for example, polyoxyethylene, polyoxypropylene, polyoxytetramethylene, polyalkylene oxide resin such as ethyleneoxide-propyleneoxide copolymer; polyethylene glycol-polyamide copolymer having a polyether segment; polyethylene glycol methacrylate copolymer; and polyurethane resin having a segment of polyethylene glycol, polypropylene glycol, polybutylene glycol, or the like. Polyalkylene oxide resin and polyurethane resin are preferred.

<Component (B)>

A component (B) is an anion adsorption processing substance obtained by processing alkali metal salt or alkaline earth metal salt by treating a compound having anionic adsorbability.

The alkali metal salt or alkaline earth metal salt used in the component (B) in the present invention group is composed of cations of alkali metal or alkaline earth metal and anions that are capable of ionic dissociation. Examples of the alkali metal or alkaline earth metal include Li, Na, K, Mg, and Ca. Preferable cations are $Li^+$, $Na^+$, and $K^+$ with a small ionic radius, and $Li^+$ is particularly preferable.

Examples of the anions that correspond to the cations of the alkali metal or alkaline earth metal include, for example, $Cl^-$, $Br^-$, $F^-$, $I^-$, $NO_3^-$, $SCN^-$, $ClO_4^-$, $CF_3SO_3^-$, $BF_4^-$, $(CF_3SO_2)_2N^-$, and $(CF_3SO_2)_3C^-$. Preferable anions are $ClO_4^-$, $CF_3SO_3^-$, $(CF_3SO_2)_2N^-$, and $(CF_3SO_2)_3C^-$, and more preferable anions are $CF_3SO_3^-$, $(CF_3SO_2)_2N^-$, and $(CF_3SO_2)_3C^-$.

The alkali metal salt or alkaline earth metal salt used in the present invention group is composed of the above cations and anions. Examples of preferable alkali metal salt include lithium perchlorate $LiClO_4$, sodium perchlorate $NaClO_4$, magnesium perchlorate $Mg(ClO_4)_2$, potassium perchlorate $KClO_4$, trifluoromethanesulfonic acid lithium $LiCF_3SO_3$, lithium bis(trifluoromethanesulfonyl)imide Li $(CF_3SO_2)_2N$, potassium bis(trifluoromethanesulfonyl)imide K $(CF_3SO_2)N$, sodium bis(trifluoromethanesulfonyl)imide Na $(CF_3SO_2)_2N$, lithium tris(trifluoromethanesulfonyl)methide Li $(CF_3SO_2)_3C$, and sodium tris(trifluoromethanesulfonyl)methide Na $(CF_3SO_2)_3C$.

More preferable anions are lithium perchlorate, trifluoromethanesulfonic acid lithium bis(trifluoromethanesulfonyl)imide lithium, and lithium tris(trifluoromethanesulfonyl)methide. Particularly preferable anions are trifluoromethanesulfonic acid lithium bis(trifluoromethanesulfonyl)imide lithium and lithium tris(trifluoromethanesulfonyl)methide. Mixture of only small amount of the above metal salt to the composition lowers electrical resistance, further eliciting antistatic properties.

The component (B) in the present invention group can be obtained by processing the above metal salt by treating a compound having anionic adsorbability.

With regard to the compound having anionic adsorbability, known compound in the art are effective such as synthetic hydrotalcite composed of magnesium and aluminum in major proportion, (co)polymer with an Mg—Al, Sb, or Ca inorganic ion exchanger, and an anion exchanger group that is held in the three-dimensional reticulated structure of the (co-)polymer.

Specific examples of the compound having anionic adsorbability include, for example, synthetic hydrotalcite (brand name: Kyoward KW-2000 and Kyoward KW-1000, available from Kyowa Chemical Industry Co., Ltd.), synthetic adsorbent (brand name: Cue Fine 2000, available from Tomita Pharmaceutical Co., Ltd.), and anion exchanger resin (brand name: Diaion DCA11, available from Nippon Rensui Co.).

The added amount of the compound having anionic adsorbability is 0.01 to 5.0 chemical equivalent to 1 chemical equivalent of the metal salt. If the added amount is less than 0.01 chemical equivalent, the amount of anion adsorption is insufficient. On the other hand, if the added amount exceeds 5.0 chemical equivalent, an antistatic effect becomes saturated, which is economically disadvantageous.

When using the anion exchanger as the compound having anionic adsorbability, the ion exchanger releases hydroxyl ions. Therefore, it is necessary to add a compound that captures the hydroxyl ions such as a carboxylic acid compound in order to remove the hydroxyl ions by means of neutralization.

Note that when the component (A) is liquid, the compound having anionic adsorbability may be removed by filtration or the like, or may be contained in the antistatic composition.

In the present invention group, a method for processing the above metal salt by treating the compound having anionic adsorbability is not particularly limited; for example, the following methods may be employed (1) A processing method such that metal salt is dissolved in a compound including moiety of an ether bond and/or moiety of an ester bond or in a solution thereof, after which a compound having anionic adsorbability is added therein.

(2) A processing method such that into a compound including moiety of an ether bond and/or moiety of an ester bond or into a solution thereof, metal salt and a compound having anionic adsorbability are simultaneously added.

(3) A processing method such that into a compound including moiety of an ether bond and/or moiety of an ester bond or into a solution thereof, a compound having anionic adsorbability is added in advance, after which metal salt is dissolved therein.

(4) A processing method such that metal salt is added in (co-)polymer including moiety of an ether bond, after which a compound having anionic adsorbability is added therein.

(5) A processing method such that into (co-)polymer including moiety of an ether bond, metal salt and a compound having anionic adsorbability are simultaneously added.

(6) A processing method such that (co-)polymer including moiety of an ether bond and having a metal salt added therein is dissolved in an appropriate solution, after which a compound having anionic adsorbability is added therein.

(7) A processing method such that into (co-)polymer including moiety of an ether bond, a compound having anionic adsorbability is added in advance, after which metal salt is dissolved therein.

The antistatic composition according to the present invention group is produced in, for example, the following manner.

First, alkali metal salt or alkaline earth metal salt is dissolved in a compound including (A) moiety of an ether bond and/or moiety of an ester bond or in a solution thereof in order to obtain a mixture. The dissolved metal salt should have a ratio of preferably 0.1 to 80 percent by weight, more preferably 0.5 to 50 percent by weight of a total of the compound including moiety of an ether bond and/or moiety of an ester bond and the metal salt.

When the component (A) is (co-)polymer including moiety of an ether bond, the alkali metal salt or the alkaline earth metal salt is added and mixed uniformly at a ratio of preferably 0.1 to 50 percent by weight, more preferably 0.5 to 30 percent by weight of a total of the (co-)polymer including moiety of an ether bond and the metal salt in order to obtain a mixture. Where necessary, the mixing may be conducted by heating and dissolving.

If the amount of the metal salt is less than the above-specified range, a sufficient antistatic effect cannot be obtained. On the other hand, if the amount of the metal salt exceeds the above-specified range, almost no improvement in an antistatic effect can be seen, which is economically disadvantageous.

Next, anion adsorption treatment is performed by adding a compound having anionic adsorbability into the mixture. Thus, an antistatic composition according to the present invention group is obtained.

Conditions for the anion adsorption treatment when the (co-)polymer is not contained in the mixture are ordinarily 20 to 100° C. temperature and a period of 10 to 120 minutes, and preferably, 30 to 90° C. temperature and a period of 20 to 90 minutes. When the (co-)polymer is contained in the mixture, the conditions vary depending on the kind of the (co-)polymer contained; ordinarily, the temperature is −20 to 200° C. and the period is 1 to 60 minutes, and preferably, the temperature is −10 to 180° C. and the period is 3 to 30 minutes. If the conditions are outside these ranges, anionic adsorbability may not be exhibited sufficiently or the copolymer may be degraded, which is not preferable.

The antistatic composition according to the present invention group may further contain at least one substance selected from the group consisting of thermoplastic resin, unvulcanized rubber, and thermoplastic elastomer.

EXAMPLE 2

The present invention will be described in detail based on, but not limited to, an example.

Note that "part," "parts," and "percent" in each example respectively denote "part by weight," "parts by weight," and "percent by weight," unless specifically noted otherwise. Although the (co-)polymer used here include that corresponds to the component (A) and that does not correspond thereto, for convenience, it is assigned the symbol (d), and thus denoted a component (d).

Note that the measuring of the surface resistivity and volume resistivity of the present Examples and Comparative Examples was performed in accordance with JIS K 6911, using a UTRS probe (Hiresta UP, made by Mitsubishi Petrochemical Co., Ltd.) and a ring electrode (Urutra Megohm Meter SM-8218 and SM-8301, made by Toa Electronics Ltd). In this measuring, applied voltages were 100 volts and 500 volts (for volume resistivity).

Components used in Examples and Comparative Examples are as follows:

c-1: bis[2-(2-butoxyethoxy)ethyl]adipate, available from Sanko Kagaku Kogyo Co., Ltd.;

c-2: bis(2-butoxyethyl)phthalate, available from Sanko Kagaku Kogyo Co., Ltd.;

c-3: polyethylene glycol dimethacrylate (number of oxymethylene units: 3), available from Mitsubishi Rayon Co., Ltd.;

c-4: propylene glycol polyether polyol (hydroxyl group (OHV): 56), brand name: Actcall MN-3050BM, available from Mitsui Takeda Chemicals, Inc.;

b-1: trifluoromethanesulfonic acid lithium $LiCF_3SO_3$, available from Morita Chemical Industries Co., Ltd.;

b-2: lithium bis(trifluoromethanesulfonyl)imide Li $(CF_3SO_2)_2N$, available from Sumitomo 3M Ltd.;

b-3: lithium perchlorate, available from Japan Carlit Co., Ltd.;

b'-1: synthetic hydrotalcite; anionic removal activation: 6.7 m chemical equivalent/g; brand name: Kyoward KW-2000, available from Kyowa Chemical Industry Co., Ltd.;

b'-2: synthetic hydrotalcite; anionic removal activation: 3.8 m chemical equivalent/g; brand name: Kyoward KW-1000, available from Kyowa Chemical Industry Co., Ltd.;

b'-3: synthetic adsorbent; anionic removal activation: 6.7 m chemical equivalent/g; brand name: Cue Fine 2000, available from Tomita Pharmaceutical Co., Ltd.;

b'-4: anion exchanger resin; anionic removal activation: 6.7 m chemical equivalent/g; brand name: Diaion DCA11, available from Nippon Rensui Co.;

d-1: nitrile rubber (amount of nitrile: 40 percent; silica contained in the nitrile rubber: 8 parts; brand name: N520, available from JSI Corporation): polysulfide rubber (made by Toray Thiokol Co., Ltd.)=90:10 (weight ratio);

d-2: ethyleneoxide-propyleneoxide copolymer, brand name: ZSN8030, available from Zeon Corporation; and d-3: thermoplastic polyurethane resin, brand name: Pandex T-1190, available from Dainippon Ink and Chemicals, Incorporated.

EXAMPLE 2-1

(b-1) trifluoromethanesulfonic acid lithium, $LiCF_3SO_3$, was added and dissolved in 100 parts (c-1) bis[2-(2-butoxyethoxy)ethyl]adipate (70° C.) so that (b-1) was 10 percent of the total of (c-1) and (b-1). Next, this solution was set at 60° C., and then b'-1: synthetic hydrotalcite (KW-2000) was added therein so that (b'-1) was 2 percent of the total of (c-1), (b-1), and (b'-1). Then, this solution was stirred at 60° C. for 60 minutes and filtered. Thus, a transparent liquid (antistatic composition) was obtained. The volume resistivity of the obtained antistatic composition was $4.1 \times 10^6$ Ω·cm.

Examples 2-2 to 2-4) and Comparative Examples 2-1 and 2-2

By the same method and under the same conditions as the above example, anion adsorption treatment was performed with varied kinds and added amounts of the component (A), alkali metal salt or alkaline earth metal salt, and synthetic hydrotalcite. Thus, antistatic compositions and comparative compositions were obtained. Note that in Example 2-4, 35 parts dimethylol butanoic add (available from Nippon Kasei Chemical Co., Ltd.) was added simultaneously with the mixture of (b'-4) Diaion. The results of the measured volume resistivity are listed in Table 2.

TABLE 2

| | Component (A) (parts) | Metal salt (%) | Compound with ability to adsorp an anion (%) | Additive (parts) | Volume resistivity (Ω · cm) |
|---|---|---|---|---|---|
| Examples | | | | | |
| 2-1 | c-1 (100) | b-1 (10) | b'-1 (2) | — | $4.1 \times 10^6$ |
| 2-2 | c-1 (100) | b-3 (18) | b'-2 (10) | — | $5.1 \times 10^6$ |
| 2-3 | c-2 (100) | b-2 (5) | b'-3 (1) | — | $3.1 \times 10^6$ |
| 2-4 | c-1/c-2 (30/70) | b-1 (30) | b'-4 (5) | dimethylol butanoic acid (35) | $5.5 \times 10^6$ |
| Comparative Examples | | | | | |
| 2-1 | c-1 (100) | b-1 (10) | — | — | $8.7 \times 10^8$ |
| 2-2 | c-1 (100) | b-3 (18) | — | — | $2.4 \times 10^9$ |

As clearly shown in Table 2, the antistatic compositions (liquid) of Examples 2-1 to 2-4 obtained by anion adsorption treatment have been found to be good antistatic compositions with reduced volume resistivity, compared with the comparative composition of Comparative Example 2-1.

A metal piece (1 cm×5 cm, 1 mm thick) was immersed in the antistatic composition (antistatic composition B2) obtained in Example 2-2 and was left to stand at 25° C. for 7 days, after which the occurrence of rust was visually inspected. No rust was found to have emerged.

A similar metal piece to the above was immersed in the comparative composition obtained in Comparative Example 2-2 and was left to stand at 25° C. for 7 days, after which the occurrence of rust was visually inspected. Rust was found to have emerged on the metal piece. In addition, the solution, which had been colorless before immersing the metal piece, was colored lightly dark brown.

EXAMPLE 2-5

Five parts antistatic composition obtained in Example 2-2 was blended with 100 parts (d-1) nitrile rubber, and this mixture was kneaded and subjected to extrusion. Thus, a sheet was prepared. In extrusion, a sheet of 0.1 mm thick was prepared using a single extruder of 20 mm with the temperature of the cylinder set at 140 to 190° C., and using a T-die with a screw of 10 to 30 rpm. The surface resistivity of this sheet was $9.1 \times 10^7$ Ω/sq. The results are listed in Table 3.

EXAMPLE 2-6

Two parts (b-1) trifluoromethanesulfonic acid lithium and 1 part (b'-1) Kyoward KW-2000) were added in 97 parts (d-2) ethyleneoxide-propyleneoxide copolymer powder, and a uniform composition [(d-2)/(b-1)/(b'-1)=97/2/1] was obtained using Henschel mixer. Subsequently, this composition was added at 10 parts of 100 parts (d-3) thermoplastic polyurethane resin, and after kneading, a sheet was formed as in the above example. The surface resistivity of this sheet was $1.1 \times 10^7$ Ω/sq. The results are listed in Table 3.

Comparative Example 2-3

A sheet was prepared in the same manner as Example 2-5 except that no antistatic composition was added. The surface resistivity of this sheet was $9 \times 10^{13}$ Ω/sq. The results are listed in Table 3.

Comparative Example 2-4

A sheet was prepared in the same manner as Example 2-6 except that no synthetic hydrotalcite was added. The surface resistivity of this sheet was $1 \times 10^9$ Ω·cm. The results are listed in Table 3.

TABLE 3

| | Component (A) (parts) | Metal salt (%) | Compound with ability to adsorp an anion (%) | Thermoplastic resin (parts) | Volume resistivity (Ω · cm) |
|---|---|---|---|---|---|
| Examples | | | | | |
| 2-5 | antistatic composition (2-2) (5) | | | d-1 (100) | $9.1 \times 10^7$ * |
| 2-6 | d-2 (97) | b-1 (2) | b'-1 (1) | d-3 (100) | $1.1 \times 10^7$ * |
| Comparative Examples | | | | | |
| 2-3 | — — | — | — | d-1 (100) | $9 \times 10^{13}$ * |
| 2-4 | d-2 (97) | b-1 (2) | — | d-2 (100) | $1 \times 10^9$ |

*: Volume resistivity; unit: (Ω/sq.)

EXAMPLE 2-7

Eighteen parts (b-2) was dissolved in 100 parts (c-3) polyethylene glycol dimethacrylate, and then (b'-1) synthetic hydrotalcite was added therein so that (b'-1) was 1 percent of the total of (c-3), (b-2), and (b'-1). Then, this solution was stirred at 60° C. for 60 minutes and filtered. Thus, a transparent liquid (antistatic composition) was obtained.

Ninety eight parts (c-3) was mixed with 2 parts antistatic composition thus obtained, and then 4 parts benzyldimethyl ketal serving as photopolymerization initiator (available from Wako Pure Chemical Industries, Ltd.) was further added in the composition. Thus, a liquid composition was obtained. The obtained liquid composition was poured into a metallic mold for use in plate-like moldings and having a recess portion. Then, an ultraviolet ray (365 nm) equivalent to 5000 mJ/cm$^2$ was radiated to the liquid composition (condition for the radiation: 40 seconds), and thus the liquid composition was cured. Thus, by liquid cast forming, a molding of cured resin with a uniform surface and a thickness of 2 mm was obtained. The volume resistivity of the obtained molding was $1 \times 10^8$ Ω·cm.

Comparative Example 2-5

A transparent liquid was obtained in the same manner as Example 2-7 except that no anion adsorption treatment using (b'-1) synthetic hydrotalcite was performed. A molding of cured resin was obtained in the same manner as Example 2-7. The volume resistivity of the obtained molding was $2 \times 10^9$ Ω·cm.

EXAMPLE 2-8

Ten parts (b-1) was dissolved in 100 parts (c-4) propylene glycol polyether polyol, and then (b'-1) synthetic hydrotalcite was added therein so that (b'-1) was 1 percent of the total of (c-4), (b-1), and (b'-1). Then, this solution was stirred at 90° C. for 60 minutes and filtered. Thus, a transparent liquid (antistatic composition) was obtained.

Ninety parts (c-4) was mixed with 10 parts antistatic composition thus obtained, and then 4.5 parts water, 0.1 part pentamethylene triamine, and 2.0 parts silicone surface active agent (brand name: Silicone Oil L-520, available from UCC) were further added. Fifty six parts tolylene diisocyanate was mixed with this mixture which was then formed into shape while stirring it. Thus, a well-uniformed molding of soft urethane foam with 48 pieces of foam per cubic inch was obtained. The surface resistivity of the obtained molding of soft urethane foam was $8 \times 10^8$ Ω·cm.

Comparative Example 2-6

A transparent liquid was obtained in the same manner as Example 2-8 except that no anion adsorption treatment using (b'-1) synthetic hydrotalcite was performed. A molding of soft urethane foam was obtained in the same manner as Example 2-8. The volume resistivity of the obtained molding was $8 \times 10^9$ Ω·cm.

The results of Examples 2-7 and 2-8, and Comparative Examples 2-5 and 2-6 are listed in Table 4.

TABLE 4

|  |  | Component (A) (parts) | (Co-)polymer (parts) | Metal salt (parts) | Compound with ability to adsorp an anion (parts) | Volume resistivity (Ω · cm) |
|---|---|---|---|---|---|---|
| Examples |  |  |  |  |  |  |
| 2-7 | preparation process | c-3 (100) | — | b-1 (18) | b'-1 (1) | $1 \times 10^8$ |
|  | photocuring process | c-3 (98) |  | benzyldimethyl ketal (4) |  |  |
| 2-8 | preparation process | c-4 (100) | — | b-1 (1) | b'-1 (1) | $8 \times 10^8$ |
|  | reaction curing process | c-4 (90) |  | water (4.5) pentamethylene triamine (0.1) silicon surface active agent (2.0) tolylene diisocyanate (56) |  |  |
| Comparative Examples |  |  |  |  |  |  |
| 2-5 | preparation process | c-3 (100) | — | b-2 (18) | — | $2 \times 10^9$ |
|  | photocuring process | c-3 (98) |  | benzyldimethyl ketal (4) |  |  |
| 2-6 | preparation process | c-4 (100) | — | b-1 (10) | — | $8 \times 10^9$ |
|  | reaction curing process | c-4 (90) |  | water (4.5) pentamethylene triamine (0.1) silicone surface active agent (2.0) tolylene diisocyanate (56) |  |  |

(3) Examples of a Third Invention Group

A third invention group according to the present invention will be described below based on drawings.

Embodiment 3

With regard to the resin to compose the antistatic composition for a coating material according to the present invention group, any resin known in the art can be used insofar as it is usable for coating materials. Specifically, examples of such resin include non-reactive type resin for a coating material such as cellulosic derivative, nitrocellulose, acetylcellulose, acetylbutylcellulose, ethylcellulose, benzylcellulose, and the like; vinyl resin, vinyl chloride-vinyl acetate polymer resin, polyvinyl butyral resin, polybutene, polybutadiene, and the like; acrylic resin; polyvinyl acetal; saturated polyester resin; and fluoroplastic, polyvinyl fluoride, tetrafluoroethylene-hexafluoropropylene copolymer resin, tetrafluoroethylene-perfluoroalkylvinylether copolymer resin, and the like; and reactive type resin for a coating material such as alkyd resin; amino resin, butylated urea resin, melamine resin, benzoguanamine resin; and the like; unsaturated polyester resin; polyurethane resin; epoxy resin; phenolic plastic, novolac phenolic resin, alkylphenolic modified resin, and the like; acrylic resin, methacrylic resin and the like; polyimide; and silicone resin. The above resin can be used alone or in a combination of two or more thereof. The reactive type resin for a coating material may be one-shot reactive type such as alkyd resin and amino resin or two-shot reactive type such as epoxy resin and polyurethane.

The antistatic composition for a coating material according to the present invention group can be used in the form of any known coating material in the art such as non-solvent coating material, organic solvent coating material, high solid coating material, powdered coating material, aqueous emulsion coating material, cathodic electrodeposition coating material, or the like.

With regard to the organic solvent that can be used for the antistatic composition for a coating material according to the present invention group, any known organic solvent in the art can be used. Specifically, examples of such organic solvent include alcohol such as methanol, ethanol, isopropanol, 1-butanol; 2-buthanol, 2-pentanol, cyclohexanol, 1-methylcyclohexanol, trans-2-methylcyclohexanol, cis-2-methylcyclohexanol, trans-3-methylcyclohexanol, cis-3-methylcyclohexanol, trans-4-methylcyclohexanol, and cis-4-methylcyclohexanol; ketone such as acetone, methyl ethyl ketone, methyl butyl ketone, methyl isobutyl ketone, cyclohexanone, 2-methylcyclohexanone, 3-methylcyclohexanone, and 4-methylcyclohexanone; ether such as diethyl ether, tetrahydrofuran, 1,4-dioxane, ethylene glycol monomethyl ether, ethylene glycol monoethyl ether, ethylene glycol diethyl ether, ethylene glycol monobutyl ether, and ethylene glycol monoethyl ether acetate; ester such as methyl acetate, ethyl acetate, propyl acetate, isopropyl acetate, butyl acetate, isobutyl acetate, pentyl acetate, isopentyl acetate, methoxy methyl acetate, ethyl lactate, dibutyl phthalate, dioctyl phthalate, dibutoxyethylate, and dibutoxyethoxyethyl adipate; aliphatic or alicyclic hydrocarbon such as n-hexane, n-pentane, mineral spirit, and cyclohexane; aromatic hydrocarbon such as toluene, o-xylene, m-xylene, p-xylene, styrene, o-cresol, m-cresol, p-cresol, and solvent naphtha; halogenated hydrocarbon such as dichloromethane, chloroform, carbon tetrachloride, trans-1,2-dichloroethylene, cis-1,2-dichloroethylene, trichloroethylene, tetrachloroethylene, 1,2-dichloroethane, 1,1,1-trichloroethane, 1,1,2,2-tetrachloroethane, chlorobenzene, and o-dichlorobenzene; N,N-dimethylformamide; and carbon bisulfide.

Examples of the polymerizable monomer, prepolymer, or oligomer that are used for the antistatic composition for a coating material according to the present invention group include any known polymerizable monomer, prepolymer, or oligomer in the art that compose a composition in the state of polymerizable monomer, prepolymer, or oligomer, and are polymerized to form a surface coat layer. Specifically, examples thereof include monofunctional acrylate such as methyl(meth)acrylate, ethyl(meth)acrylate, propyl(meth)acrylate, n-butyl(meth)acrylate, t-butyl(meth)acrylate, isobutyl(meth)acrylate, 2-ethylhexyl(meth)acrylate, isoamyl(meth)acrylate, isooctyl(meth)acrylate, decyl(meth)acrylate, isodecyl(meth)acrylate, n-nonyl(meth)acrylate, cyclohexyl(meth)acrylate, lauryl(meth)acrylate, stearyl(meth)acrylate, benzil(meth)acrylate, dicydopentanyl(meth)acrylate, 2-dicydopentenoxyethyl(meth)acrylate, tricyclodecanyl(meth)acrylate, a hydrogenated substance thereof, isobornyl(meth)acrylate, methoxyethyl(meth)acrylate, ethoxyethoxyethyl(meth)acrylate, phenoxyethyl(meth)acrylate, phenoxypropyl(meth)acrylate, tetrahydrofurfuryl(meth)acrylate, 2-hydroxyethyl(meth)acrylate, 2-hydroxypropyl(meth)acrylate, 4-hydroxybutyl(meth)acrylate, (meth)acrylic acid, and (meth)acryloilmorpholine; bifunctional acrylate such as polyethylene glycol di(meth)acrylate, 1,3-propylene glycol di(meth)acrylate, 1,4-heptanediol di(meth)acrylate, 1,6-hexanediol di(meth)acrylate, neopentyl glycol di(meth)acrylate, 2-butine-1,4-di(meth)acrylate, cyclohexane-1,4-dimethanol di(meth)acrylate, bisphenol A hydride di(meth)acrylate, 1,5-pentane di(meth)acrylate, trimethylolethane di(meth)acrylate, tricyclodecanyl di(meth)acrylate, a hydrogenated substance thereof, trimethylolpropane di(meth)acrylate, dipropylene glycol di(meth)acrylate, 1,3-butylene glycol di(meth)acrylate, 2,2-bis-(4-(meth)acryloxypropoxyphenyl)propane, 2,2-bis-(4-(meth)acryloxy(2-hydroxypropoxy)phenyl)propane, and bis-(2-methacryloiloxyethyl)phthalate; and polyfunctional acrylate such as trimethylolpropane tri(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, dipentaerythritol hexa(meth)acrylate, tripentaerythritol tetra(meth)acrylate, tripentaerythritol penta(meth)acrylate, tripentaerythritol hexa(meth)acrylate, tripentaerythritol hepta(meth)acrylate, and tripentaerythritol octa(meth)acrylate. In addition, low-molecular polyhydric alcohol with at least three hydroxyl groups in the molecules thereof and with carbons of 3 to 16, and polyol in which the chain is extended by adding a lactone compound such as ε-caprolactam to the low-molecular polyhydric alcohol can also be used here. Specifically, examples thereof include trimethylolethane, trimethylolpropane, 1,2,4-butanetriol, ditrimethylolpropane, pentaerythitol, dipentaerythritol, glycerol, a mixture thereof, and an additive of them and a lactone compound such as ε-caprolactone, γ-caprolactone, γ-valerolactone, δ-valerolactone, and γ-butyrolactone. Silicate oligomer is another example.

When the antistatic composition for a coating material according to the present invention group is used as a non-solvent coating material, an organic solvent coating material, or a high solid type coating material, then at least one compound selected from the group consisting of lithium bis(trifluoromethanesulfonyl)imide, lithium tris(trifluoromethanesulfonyl)methide, and trifluoromethanesulfonic acid lithium is dissolved in any of an organic solvent, polymerizable monomer, prepolymer, or oligomer. Thus, the antistatic composition for a coating material according to the present invention is produced. When the antistatic composition for a coating material is used as an aqueous emulsion coating material, the above lithium compound is dissolved in water, thus producing the antistatic composition for a coating material according to the present invention. When the antistatic composition for a coating material is used as a powdered coating material, the above lithium compound is dissolved in water, an organic solvent, or the like together with resin, and then the solvent is removed to powderize the compound. Thus, the antistatic composition for a coating material according to the present invention is produced.

The antistatic composition for a coating material according to the present invention group may be dried, set or cured by known methods in the art such as, depending on the kind of resin used, solvent volatilization, oxidation under room temperature, oxidation by warning, condensation, or polymerization in order to form a surface coat layer.

In particular, when photopolymerizable resin such as acrylic resin, epoxy resin, polyurethane resin, and silicone resin is used for the composition according to the present invention, curing can be performed by radiation of an activation energy ray such as an ultraviolet ray, a visible ray, and an electron ray. When the curing is performed by polarization using ultraviolet or visible rays, photopolymerization initiator is preferably included in the composition.

The photopolymerization initiator that can be used may be any known photopolymerization initiator in the art. Specifically, examples thereof include benzophenone, 4-phenylbenzophenone, 4-benzoyl-4'-methyldiphenylbenzophenone, 3,3'-dimethyl-4-methoxybenzophenone, benzoin, benzoinmethyl ether, benzoinethyl ether, benzoinisopropyl ether, benzoinisobutyl ether, benzyldimethyl ketal, diethoxyacetophene, 2-hydroxy-2-methyl-1-phenyl-1-propanone, 2-methyl-1-[4-(methylthio)phenyl]-2-morpholino-1-propanone, 1-hydroxycyclohexylphenylketone, thioxantone, 2-chlorothioxantone, 2,4-dimethylthioxantone, 2-isopropylthioxantone, 2,4-diethylthioxantone, 2,4,6-trimethylbenzoyldiphenylphosphineoxide, camphor chinone, anthracene, benzil, and phenylmethylglyoxilate. The above photopolymerization initiator can be used alone or in a combination of two or more thereof.

To increase the speed of polarization, one or more auxiliaries for initiating photoreaction or photosensitizers may be used together with the photopolymerization initiator. Specifically, examples thereof include triethanolamine, diethanolamine, methyldiethanolamine, triisopropanolamine, 4,4'-diethylaminobenzophein, 4-dimethylaminoethylbenzoate, 4-dimethylaminoisoamylbenzoate, benzoic acid-2-dimethylaminoethyl, dibutylamine, triethylamine, triethylenetetramine, diethylaminoethyl(meth)acrylate, and tributylphosphine.

Furthermore, examples of additive that can also be added in the composition of the present invention include dye, pigment, filler, silane coupling agent, adhesion modifier, stabilizer, leveling agent, antifoaming agent, anti-settling additive, lubricant, and rust preventive.

With regard to the applied amount of the antistatic composition for a coating material according to the present invention, the thickness of the cured surface coat layer is 1 to 25 μm, preferably 3 to 15 μm, and particularly preferably 5 to 10 μm. If the surface coat layer is less than 1 μm thick, sufficient antistatic properties cannot be obtained. If the thickness of the surface coat layer exceeds 25 μm, adhesiveness decreases, which is not preferable.

EXAMPLE 3

The present invention will be described in detail based on, but not limited to, an example.

Note that "part" and "parts" in each example respectively denote "part by weight" and "parts by weight," "lithium imide" denotes "lithium bis(trifluoromethanesulfonyl) imide," "lithium methide" denotes lithium tris(trifluoromethanesulfonyl)methide, and "lithium triflate" denotes "trifluoromethanesulfonic acid lithium."

Also note that the measuring of the surface resistivity and volume resistivity of the following Examples and Comparative Examples was performed in accordance with JIS K 6911, using a URS probe (Hiresta UP, made by Mitsubishi Petrochemical Co., Ltd.) and a ring electrode (Urutra Megohm Meter SM-8218 and SM-8301, made by Toa Electronics Ltd.). Applied voltages were 100 volts and 500 volts.

EXAMPLE 3-1

A composition for a coating material in the state of a solution of 2 percent by weight was prepared using 65 parts polyethylene glycol methacrylate (polymerization degree: 90, oxyethylene unit: 20) water soluble resin, 2 parts lithium imide, 7 parts water melamine resin, and 15 parts nonionic surface active agent (brand name: Nonion NS 208.5, available from NOF Corporation). A melt-extrusion non-stretched sheet of polyethylene terephthalate (intrinsic viscosity: 0.65, orthochlorophenol, 35° C.) was stretched by a factor of 3.5, and then 10 g/m$^2$ of the composition for a coating material was applied to a single side of the film by a casting method. Subsequently, the film was extended laterally by a factor of 3.8 (105° C.) and subjected to heating treatment (205° C.). Thus, a transparent single-side-coated polyester film with 15 μm total thickness of the film and surface coat layer was obtained. The surface resistivity of this film was $2 \times 10^8$ Ω/sq.

Comparative Example 3-1

A single-side-coated polyester film of Comparative Example 3-1 was obtained in the same manner as Example 3-1 except that 2 parts lithium perchlorate was dissolved instead of lithium imide. The surface resistivity of this film was $2 \times 10^{10}$ Ω/sq.

EXAMPLE 3-2

125 parts 4,4'-diphenylmethane diisocyanate and 260 parts methyl ethyl ketone (having dissolved therein 10 parts lithium methane) were added in 100 parts polytetramethylene ether glycol with a number average molecular weight of 2000 and a hydroxylic group at both of its ends, and they were allowed to react at 80° C. Thus, a polyurethane solution with a concentration of 30 percent by weight was obtained. Then, this solution was applied to an amount of 20 g/m$^2$ to a film (0.5 mm thick) of polyethylene terephthalate using gravure printing machine. The solvent was removed with a hot air of 50 to 60° C. Thus, a transparent antistatic sheet with a conductive layer of 10 μm thick was obtained. The surface resistivity of this sheet was $3 \times 10^8$ Ω/sq. On this antistatic sheet, washed plates of copper and of aluminum were placed and left to stand for 7 days in an atmosphere of a relative humidity of 40 percent and of a temperature of 20° C., after which each of the plates were visually inspected. No rust was found to have emerged.

Comparative Example 3-2

An antistatic sheet of Comparative Example 2 was obtained in the same manner as Example 3-2 except that 10 parts lithium perchlorate was dissolved instead of lithium methane. Note that when the lithium perchlorate was dissolved in methyl ethyl ketone, a remarkable amount of heat evolved. Because of this heat, the 10 parts lithium perchlorate was dissolved little by little with care in 260 parts methyl ethyl ketone, during which the lithium perchlorate was cooled by ice. The surface resistivity of this film was $1 \times 10^{10}$ Ω/sq.

EXAMPLE 3-3

Two parts polyethylene glycol dimethacrylate (oxymethylene unit 6) in which 20 parts lithium imide was dissolved and 98 parts polyethylene glycol dimethacrylate (oxymethylene unit: 6) without lithium imide contained therein were mixed. Subsequently, 4 parts benzyldimethyl ketal serving as photopolymerization initiator was added in the mixture. Thus, a liquid composition was obtained. Next, this liquid composition was poured into a flat-plate-like mold with a recess portion, and then an ultraviolet ray equivalent to 5000 mJ/cm$^2$ was radiated to the liquid composition. Thus, by cast forming, a molding of cured resin with a uniform surface and a thickness of 2 mm was obtained. The volume resistivity of this molding was $2 \times 10^9$ Ω·cm.

Comparative Example 3-3

A cured-resin-composition molding in Comparative Example 3 was obtained in the same manner as Example 1 except that 20 parts lithium perchlorate was added instead of lithium imide. There were fine particles found on the surface of the cured resin. The volume resistivity of this molding was $2 \times 10^{11}$ Ω·cm.

EXAMPLE 3-4

Ten parts solvent (isobutanol:toluene=3:1) in which lithium triflate was dissolved and 90 parts polyethylene glycol diacrylate (oxyethylene unit: 9) were mixed. Subsequently, 4 parts benzophenone and 4 parts methyl phenyl glyoxilate were added in the mixture. Thus, a liquid composition was obtained. This liquid composition was applied by spray on an injection molding plate (50 mm×50 mm×3 mm) of polycarbonate resin and dried with hot air drier (60° C.) for 3 minutes. In the air, an ultraviolet ray was radiated to the molding plate to an integrated light amount of 1500 mJ/cm$^2$ (radiation period 10 seconds) using high-pressure mercury vapor lamp. Thus, a transparent polycarbonate resin plate with a cured surface coat layer of 7 μm thick was obtained. The surface resistivity of this resin plate was $2 \times 10^9$ Ω/sq.

Comparative Example 3-4

A transparent polycarbonate resin plate of Comparative Example 4 with a cured surface coat layer of 8 μm thick was obtained in the same manner as Example 4 except that barium perchlorate was dissolved instead of lithium triflate. The surface resistivity of this film was $2 \times 10^{10}$ Ω/sq.

EXAMPLE 3-5

Five parts lithium imide was dissolved in a mixture of 5 parts epoxy acrylate, 25 parts trimethylolpropane triacrylate, 20 parts neopentyl glycol diacrylate, and 50 parts polyethylene glycol diacrylate. Then, 4 parts 2-methyl-2-hydroxypropylphenone was further added in the mixture. This mixture was coated on a disc substrate by spinner and cured with an ultraviolet ray. Thus, antistatic resin constitution for a coating material was obtained. The voltage damping resistance of this coating structure was measured when a voltage of 8 kV was applied. When voltage resistance was 400 V, the half life was 1.25 seconds.

Comparative Example 3-5

Antistatic resin coating structure for a coating material of Comparative Example 3-5 was obtained in the same manner as Example 3-5 except that lithium perchlorate was dissolved instead of lithium imide. The voltage damping resistance of this coating structure was measured when a voltage of 8 kV was applied. When voltage resistance was 3000 V, the half life was 10 seconds or more.

EXAMPLE 3-6

An electrolytic solution (A) made of 22 parts water-soluble epoxy resin, 1.8 parts diethylamine, 8 parts titanium white, 2.3 parts lithium imide, 1.5 parts basic silicate, and 33.6 parts water, and an electrolytic solution (13) made of 8.6 parts polyisocyanate and 22.2 parts cellosolve were prepared Then, the solutions (A) and (B) were blended and this mixture was applied on a steel plate that was for serving as a substrate and was provided with sufficient adhesion by water washing to a thickness of 30 μm by electrostatic coating (applied voltage: 60 kV). Then this product was subjected to baking for 20 minutes at 170° C. Thus, a white surface coat layer was formed. The surface resistivity of this film was $2 \times 10^{10}$ Ω/sq.

Comparative Example 3-6

An electrolytic solution A of Comparative Example 3-6 was prepared in the same manner as Example 3-6 except that lithium perchlorate was dissolved instead of lithium imide. The generated electrolytic solution was not uniform because of precipitates.

(3) Examples of a Fourth Invention Group

Embodiment 4

Alkyl amide or an alkylene oxide adduct of alkylene amide and alkyl amine or an alkylene oxide adduct of alkylene amine are represented by the following formulae (2) and (3):

(2)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50; and

(3)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50.

The alkyl group or alkylene group represented by R1 includes a straight-chained or branched alkyl group or a straight-chained or branched alkylene group. The number of carbons included in the alkyl group or alkylene group may be determined such that the molecules thereof are provided with hydrophilicity and hydrophobicity to an appropriate extent. Examples of such alkyl group or alkylene group include preferably an alkyl group or alkylene group with 8 to 22 carbons, more preferably an alkyl group or alkylene group with 10 to 20 carbons, and particularly preferably an alkyl group or alkylene group with 12 to 18 carbons.

The oxyalkylene group include preferably an oxyalkylene group with 2 to 10 carbons, more preferably an oxyalkylene group with 2 to 6 carbons, and particularly preferably an oxyalkylene group with 2 to 4 carbons. Specifically, examples of such oxyalkylene group include oxyethylene and oxypropylene, and oxyethylene is preferable. R1 and R2 may be identical to each other or different from each other.

It is possible that x and y are identical to each other or different from each other, but they are preferably identical. If they are different, x can be 0.

The above alkyl amide or an alkylene oxide adduct of alkylene amide and alkyl amine or an alkylene oxide adduct of alkylene amine can be used alone or in a combination of two or more thereof.

The terms polymerizable monomer, prepolymer, oligomer, and polymer denote polymer material and polymer raw material thereof. Polymer material is ultimately used as a molding of resin or rubber.

With regard to the resin used for the composition of the present invention, any known resin in the art can be used. Specifically, examples of such resin include thermoplastic resin such as polyolefin resin, polyethylene, polypropylene, polybutene, EVA resin, EVOH resin, and the like; polystyrene resin, polystyrene, AS resin, ABS resin, AXS resin, and the like; polyamide resin, nylon 6, nylon 6, 6, nylon 6, 10, nylon 12, and the like; acetal resin; saturated polyester, polyethylene terephthalate, polybutylene terephthalate, poly 1,4-cyclohexyldimethylene terephthalate, wholly aromatic polyester, and the like; polycarbonate; acrylic resin; thermoplastic elastomer; vinyl chloride resin, vinyl chloride resin, vinylidene chloride resin, and the like; fluorocarbon resin, polyvinyl fluoride, tetrafluoroethylene-hexafluoropropylene copolymer resin, tetrafluoroethylene-perfluoroalkylvinylether copolymer resin, and the like; liquid crystal polyester; polyarylate; polysulfone; and polyphenylene ether; and thermosetting resin such as alkyd resin; unsaturated polyester resin; polyurethane resin; epoxy resin; phenolic plastic, novolac phenolic resin, alkylphenolic modified resin, and the like; melamine resin; urea resin; diallylphthalate resin; polyimide; and silicone resin. Thermoplastic resin is preferred for its readiness to produce a composition, and polyolefin resin and polystyrene resin are particularly preferred. The above resin can be used alone or in a combination of two or more thereof.

With regard to the rubber used for the composition of the present invention, any known rubber in the art can be used. Specifically, examples of such rubber include natural rubber; isoprene rubber; butadiene rubber; styrene-butadiene rubber and SBR; butyl rubber; ethylene-propylene rubber, EPR, EPDR, EPDM; chloroprene rubber; acrylonitrile-butadiene rubber and NBR; chlorosulfonated polyethylene; epichlorohydrin rubber, CHR, and ECO; chlorinated polyethylene; silicone rubber; fluorinated rubber; urethane rubber; styrene-butadiene copolymer; and the like. The above rubber can be used alone or in a combination of two or more thereof.

Alternatively, the above resin and rubber can be used in combination.

The antistatic composition according to the present invention is produced in, for example, the following manner.

First, at least one lithium salt (E) selected from the group consisting of lithium bis(trifluoromethanesulfonyl)imide, lithium tris(trifluoromethanesulfonyl)methide, and trifluoromethanesulfonic acid lithium is dissolved in at least one compound (D) selected from the group consisting of alkyl amide or an alkylene oxide adduct of alkylene amide represented by the following formula (2), and alkyl amine or an alkylene oxide adduct of alkylene amine represented by the following formula (3).

The lithium salt (E) is dissolved so that the lithium salt (E) is 0.1 to 50 percent by weight, preferably 0.5 to 30 percent by weight of the at least one compound (D) selected from the group consisting of alkyl amide or an alkylene oxide adduct of alkylene amide represented by the above formula (2), and alkyl amine or an alkylene oxide adduct of alkylene amine represented by the above formula (3)., Next, the mixture of the compound (D) and the lithium salt (E) is added in at least one compound (F) selected from the group consisting of polymerizable monomer, prepolymer, oligomer, and polymer. Thus, a composition according to the present invention is obtained.

The mixture of the compound (D) and the lithium salt (E) is added so that the total (D+E) of the at least one compound selected from the group consisting of alkyl amide or an alkylene oxide adduct of alkylene amide represented by the above formula (2), and alkyl amine or an alkylene oxide adduct of alkylene amine represented by the above formula (3) and the lithium salt is included at 0.05 to 10.0 parts by weight, preferably 0.1 to 5.0 parts by weight, more preferably 0.25 to 2.0 parts by weight of 100 parts by weight of the compound (F), which is at least one compound selected from the group consisting of polymerizable monomer, prepolymer, oligomer, and polymer.

A method for producing the composition according to the present invention is not particularly limited; any known methods in the art can be employed. For example, dry blending can be performed using Henschel mixer, ribbon blender, super mixer, tumbler, or the like. Alternatively, melt kneading can be performed using single screw or twin screw extruder, Banbury mixer, plastomill, Ko-kneader, roll, or the like. Where necessary, the production of the composition can be performed in an atmosphere of inert gas such as nitrogen. The shape of the obtained composition is not particularly limited; it may be in any forms such as powder, pellet, sheet, strand, and chip. Alternatively, the composition may be in a solution liquid state in which the mixture of the compound (D) and the lithium salt (E) is added in the at least one compound (F) selected from the group consisting of polymerizable monomer, prepolymer, oligomer, and polymer, all of which are in a solution liquid state.

To the antistatic composition according to the present invention, any known additive in the art can be added as necessary such as antioxidant, heat stabilizer, ultraviolet absorber, fire retardant, fire retardant auxiliary, coloring agent, pigment, antimicrobial and antifungal agent, light resistance agent, plasticizer, tackifier, dispersing agent, antifoaming agent, curing catalyst, curing agent, leveling agent, coupling agent, filler, vulcanizing agent, and vulcanization accelerator.

The antistatic composition obtained by the above production method can be formed into shape by any known forming methods in the art such as compression molding, transfer molding, laminated molding, injection molding, extrusion molding, blow molding, calendering, casting, pasting, powdering, reaction molding, thermoforming, blow molding, rotational molding, vacuum molding, cast molding, and gas-assisted molding. Alternatively, the antistatic composition according to the present invention can be used as an antistatic coating material composition.

The molding according to the present invention can be widely applied to products that are required to maintain high antistatic properties over a long period. Examples of such products include vehicle parts, household electrical appliance parts, electronics device parts, manufacturing equipment of electronic material, information office equipment parts, communication equipment, housing members, optical machine parts, sundry goods, industrial material, wrapping material used in distribution, and the like. More specifically, the molding can be utilized as tires, hoses, films for wrapping, wrapping material, sealing material, gloves, synthetic leather, ICs, condensers, transistors, carrier tapes for electronic parts such as LSIs and containers called carrier trays. In addition, the molding may have any colors.

EXAMPLE 4

The present invention will be described in detail based on, but not limited to, an example.

Note that the measuring of the surface resistivity and volume resistivity of the following Examples and Comparative Examples was performed in accordance with JIS K 6911, using a URS probe (Hiresta UP, made by Mitsubishi Petrochemical Co., Ltd.) and a ring electrode (Urutra Megohm Meter SM-8218 and SM-8301, made by Iba Electronics Ltd.). In this measuring, applied voltages were 100 volts and 500 volts.

At least one compound (D) selected from the group consisting of alkyl amide or an alkylene oxide adduct of alkylene amide and alkyl amine or an alkylene oxide adduct of alkylene amine, and at least one lithium salt (E) selected from the group consisting of lithium bis(trifluoromethanesulfonyl)imide, lithium tris(trifluoromethanesulfonyl)methide, and trifluoromethanesulfonic acid lithium were blended. The following table shows the kind and ratio of (D) and (E).

TABLE 5

| Mixture No. | Kind of compound(A) | Lithium salt Kind | Added amount (% by weight) |
|---|---|---|---|
| P-1 | AMD-1 | BI | 10 |
| P-2 | AMD-2 | FM | 30 |
| P-3 | AMD-1 | BI | 5 |
| P-4 | AN | TM | 2 |
| P-5 | AMD-3 | BI | 20 |
| P-6 | AMD-1 | BI | 0.1 |
| P-7 | AMD-3 | FM | 50 |

AMD-1: polyoxyethylene alkyl (with $C_{14}$ to $C_{18}$ mixed) amide (additional molar number of ethylene oxide: 5)
AMD-2: polyoxyethylene ricinoleic amide ether (additional molar number of ethylene oxide: 8)
AMD-3: polyoxyethylene alkyl (with $C_{14}$ to $C_{18}$ mixed) amide (additional molar number of ethylene oxide: 50)
AN: polyoxyethylene alkyl (with $C_{14}$ to $C_{18}$ mixed) amine (additional molar number of ethylene oxide: 10)
BI: lithium bis (trifluoromethanesulfonyl) imide
FM: trifluoromethanesulfonic acid lithium
TM: lithium tris (trifluoromethanesulfonyl) methide

EXAMPLE 4-1~EXAMPLE 4-7

As shown in the following table, a mixture of the compound (D) and the lithium salt (E) shown in Table 1 was added in seven kinds of resin and rubber. The addition ratios are listed in Table 2. Each of the obtained compositions was kneaded using kneader that was set to the processing temperature of each of the resin and rubber, and then each was injection-molded. Thus, specimens of Examples 1 to 7 with 6 cm wide×6 cm long×0.3 thick were prepared.

Comparative Example 4-1~Comparative Example 4-7

Specimens of Comparative Examples 4-1 to 4-7 were prepared in the same manner as Examples 4-1 to 4-7 except that no mixtures of the compound (D) and the lithium salt (E) were added.

Experimental Example 4-1

Surface resistivity was measured for the specimens of Examples 4-1 to 4-7 and Comparative Examples 4-1 to 4-7. The results are listed in Table 6.

TABLE 6

| | Example 1 | Example 2 | Example 3 | Example 4 | Example 5 |
|---|---|---|---|---|---|
| Compound (C) | PP | EPDM | PS | TPU | PC |
| Mixture No. | P-1 | P-2 | P-3 | P-4 | P-5 |
| Added mount (% by weight) | 0.25 | 0.5 | 1.0 | 0.5 | 0.25 |
| Surface resistivity (Ω/sq.) | $2 \times 10^8$ | $2 \times 10^7$ | $9 \times 10^7$ | $3 \times 10^6$ | $5 \times 10^{10}$ |

| | Comparative Example 1 | Comparative Example 2 | Comparative Example 3 | Comparative Example 4 | Comparative Example 5 |
|---|---|---|---|---|---|
| Compound (C) | PP | EPDM | PS | TPU | PC |
| Mixture No. | — | — | — | — | — |
| Added mount (% by weight) | — | — | — | — | — |
| Surface resistivity (Ω/sq.) | $2 \times 10^{13}$ | $2 \times 10^{14}$ | $2 \times 10^{14}$ | $6 \times 10^{12}$ | $3 \times 10^{15}$ |

PP: polypropylene
EPDM: ethylene-butadiene-diene copolymer rubber
PS: polystyrene
TPU: thermoplastic polyurethane elastomer
PC: polycarbonate As clearly shown in Table 6, it was found that the specimens of Examples 1 to 5 had low surface resistivity than Comparative Examples 1 to 5 did. The specimens of Examples 1 and 2 were left to stand under a low humidity atmosphere with a relative humidity of 20 percent for two days. Then, the surface resistivity of the specimens of Examples 1 and 2 were measured again, the values of which were respectively $4 \times 10^8$ Ω·cm and $3 \times 10^7$ Ω·cm. Thus, it has been found that the molding according to the present invention maintains its antistatic properties even under a low humidity atmosphere.

EXAMPLE 4-8

Sixty seven parts by weight aliphatic amine curing agent (brand name: Epikure 454, available from Yuka Shell Epoxy K.K.) and 0.5 part by weight mixture P-1 shown in Table 1 were blended with 100 parts by weight epoxy resin main agent (brand name: Epikote 828, available from Yuka Shell Epoxy K.K.). Thus, a composition was obtained. Then, this composition was applied to an aluminum plate (3 mm thick) to a thickness of 2 mm and polymerized. This molding was left to stand in an atmosphere of 23° C.×65 percent RH for 24 hours. Then, the surface resistivity of the molding was measured, the value of which was $2.7 \times 10^9$ Ω·cm.

Comparative Example 4-8

An aluminum coating product of Comparative Example 4-8 was obtained in the same manner as Example 8 except that no mixtures were applied. The surface resistivity of this coating product was $3.2 \times 10^{14}$ Ω·cm.

EXAMPLE 4-9

Three parts by weight zinc oxide, 75 parts by weight silica white, and 1 part by weight mixture P-3 shown in Table 1 were blended with 100 parts by weight styrene-butadiene rubber; Thus, a composition was obtained. Then, this composition was kneaded with roll, and further kneaded after adding 2 parts by weight sulfur and vulcanization accelerator in the composition. This composition was vulcanized with press. Thus, a rubber sheet of 1 mm thick was prepared. The volume resistivity of this sheet was $2 \times 10^7$ Ω·cm. As a result of a visual inspection of this sheet, no bleeding-out was found.

Comparative Example 4-9

A rubber sheet of Comparative Example 4-9 was obtained in the same manner as Example 9 except that as antistatic agent, 1 part by weight solution in which lithium bis(trifluoromethanesulfonyl)imide was dissolved at 5 percent by weight of polyethylene glycol (polymerization degree: 600, 20 percent of acetonitrile added) was used. Even though the volume resistivity of this rubber sheet was $2 \times 10^9$ Ω·cm, bleeding-out was found to have occurred.

EXAMPLE 4-10

Thirty parts by weight plasticizer (DOP), 1 part by weight calcium stearate, 1 part by weight zinc stearate, 3 parts by weight epoxidized soybean oil, and 5.0 parts by weight mixture P-3 shown in Table 1 were blended with 100 parts by weight polyvinyl chloride with a polymerization degree of 1000. Thus, a composition was obtained. This composition was mixed at 160° C. for 5 minutes using mixing roll and subjected to press molding. Thus, a transparent sheet of 1.0 mm thick was prepared. The surface resistivity of this sheet was $5 \times 10^7$ Ω·cm. This sheet was heated at 190° C. for 30 minutes and the surface resistivity thereof was further measured, the value of which was $1 \times 10^8$ Ω·cm. The sheet remained transparent.

Comparative Example 4-10

A sheet of Comparative Example 4-10 was obtained in the same manner as Example 4-10 except that as antistatic agent, 5.0 parts by weight lithium bis(trifluoromethanesulfonyl)imide was added. The surface resistivity of this coating substance was $5 \times 10^{11}$ Ω·cm. This sheet was heated at 190° C. for 30 minutes and the surface resistivity thereof was further measured, the value of which was $9 \times 10^{11}$ Ω·cm. The sheet changed its color to dark brown.

EXAMPLE 4-11

Two parts by weight polyethylene glycol dimethacrylate (number of oxyethylene units: 6) in which 1 part by weight mixture P-7 shown in Table 1 was dissolved, and 98 parts by weight polyethylene glycol dimethacrylate (number of oxymethylene units: 6) without P-7 dissolved therein were mixed. Thus, a solution was obtained. Into this solution, 4 parts by weight benzyldimethyl ketal that served as photopolymerization initiator was added. Thus, a liquid composition was obtained This composition was poured into a flat-plate-like mold with a recess portion, and then an ultraviolet ray (365 nm) equivalent to 5000 mJ/cm² was radiated to the composition. Thus, by cast forming, a cured-resin-composition molding with a uniform surface and with a thickness of 2 mm was obtained. The volume resistivity of this cured-resin-composition molding was measured, the value of which was $8 \times 10^8$ Ω·cm.

Comparative Example 4-10

A cured-resin-composition molding was obtained in the same manner as Example 4-11 except that the composition P-7 shown in Table 1 was not added. The volume resistivity of this cured-resin-composition molding was $4 \times 10^{13}$ Ω·cm.

INDUSTRIAL APPLICABILITY

As has been described above, the antistatic composition according to the present invention provides a molding that is excellent in electric resistivity and is capable of exhibiting high antistatic properties over a long period of time.

In addition, even though metal salt such as lithium perchlorate and sodium perchlorate is contained in the composition of the present invention, when wrapping metal with a film or a sheet made of the composition, there is no corrosion, rust, or contamination on the metal surface.

Accordingly, the industrial applicability of the present invention is considerable.

What is claimed is:

1. A method for producing an antistatic polyurethane composition by allowing polyol having at least two activated hydrogen atoms to react with isocyanate, the method comprising:

making, separately and beforehand, a solution of said polyol in which lithium bis(trifluoromethanesulfonyl) imide or lithium tris(trifluoromethanesulfonyl)methide is dissolved; and mixing said solution with the isocyanate and allowing the polyol to react with the isocyanate.

2. The method for producing an antistatic composition according to claim 1, wherein lithium bis(trifluoromethanesulfonyl)imide or lithium tris (trifluoromethanesulfonyl)methide is dissolved at 2 to 90 percent by weight in said solution.

3. An antistatic composition comprising:

(A) polyethylene glycol di(meth)acrylate in which alkali metal salt or alkaline earth metal salt is dissolved; and (B) an anion adsorption processing substance obtained by processing said alkali metal salt or alkaline earth metal salt by treating a compound having anionic adsorbability; and wherein the compound having anionic adsorbability comprises at least one selected from the group consisting of synthetic hydrotalcite composed of magnesium and aluminum, and an anion exchanger.

4. The antistatic composition according to claim 3, wherein the metal salt is at least one lithium salt selected from the group consisting of lithium perchloride, trifluoromethanesulfonic acid lithium, lithium bis(trifluoromethanesulfonyl)imide, and lithium tris(trifluoromethanesulfonyl)methide.

5. A method for producing an antistatic composition, comprising:
adding alkali metal salt or alkaline earth metal salt in polyethylene glycol di(meth)acrylate; and
further adding a compound having anionic adsorbability, the compound being selected from the group consisting of synthetic hydrotalcite composed of magnesium and aluminum in major proportion, and an anion exchanger.

6. A method for producing an antistatic composition, comprising, adding
alkali metal salt or alkaline earth metal salt, and
a compound having anionic adsorbability in polyethylene glycol di(meth)acrylate, the compound being selected from the group consisting of synthetic hydrotalcite composed of magnesium and aluminum in major proportion, and an anion exchanger.

7. A method of preparing an antistatic composition for a coating material comprising:
preparing a polyethylene glycol di(meth)acrylate having at least six oxyethylene units in which at least one compound selected from the group consisting of lithium bis(trifluoromethanesulfonyl)imide, lithium tris(trifluoromethanesulfonyl)methide and lithium trifluoromethanesulfonate is dissolved; and
adding the polyethylene glycol di(meth)acrylate in the coating material.

8. A method of preparing an antistatic composition for a coating material according to claim 7, wherein at least said one compound selected from the group consisting of lithium bis(trifluoromethanesulfonyl)imide, lithium tris(trifluoromethanesulfonyl)methide, and lithium trifluoromethanesulfonate is included at 0.05 to 10.0 parts by weight of 100 parts by weight of a coating-layer forming component included in the antistatic composition for a coating material.

9. A method for producing an antistatic composition for a coating material, comprising:
preparing a polyethylene glycol di(meth)acrylate having at least six oxyethylene units in which at least one compound selected from the group consisting of lithium bis(trifluoromethanesulfonyl)imide, lithium tris (trifluoromethanesulfonyl)methide, and lithium trifluoromethanesulfonate is dissolved; and
mixing the polyethylene glycol di(meth)acrylate with a composition for a coating material.

10. A method for producing a molding comprising a surface coat layer of an antistatic composition for a coating material comprising:
preparing a polyethylene glycol di(meth)acrylate having at least six oxyethylene units in which at least one compound selected from the group consisting of lithium bis(trifluoromethanesulfonyl)imide, lithium tris (trifluoromethanesulfonyl)methide, and lithium trifluoromethanesulfonate is dissolved;

mixing the polyethylene glycol di(meth)acrylate with a composition for a coating material to form a surface coat material; and
applying the surface coat material to a molding.

11. An antistatic composition comprising a combination of a compound (D), a lithium salt (E), and a compound (F), the compound (D) being at least one compound selected from the group consisting of alkyl amide or an alkylene oxide adduct of alkylene amide represented by the following formula (2), and alkyl amine or an alkylene oxide adduct of alkylene amine represented by the following formula (3), the lithium salt (E) being at least one lithium salt selected from the group consisting of lithium bis(trifluoromethanesulfonyl)imide, lithium tris(trifluoromethanesulfonyl)methide, and trifluoromethanesulfonic acid lithium, and the compound (F) being at least one compound selected from the group consisting of polymerizable monomer, prepolymer, oligomer, and polymer:

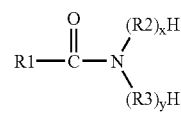
(2)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50; and

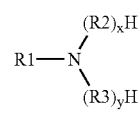
(3)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50.

12. The antistatic composition according to claim 11, wherein the alkyl amide or the alkylene oxide adduct of alkylene amide represented by the above formula (2) is polyoxyethylene alkyl amide, polyoxyethylene alkylene amide, polyoxypropylene alkyl amide, or polyoxypropylene alkylene amide, and the alkyl amine or the alkylene oxide adduct of alkylene amine represented by the above formula (3) is polyoxyethylene alkyl amine, polyoxyethylene alkylene amine, polyoxypropylene alkyl amine, or polyoxypropylene alkylene amine.

13. The antistatic composition according to claim 11 or 12 wherein the lithium salt (E) is blended at 0.1 to 50 percent by weight of the at least one compound (D) selected from the group consisting of alkyl amide or an alkylene oxide adduct of alkylene amide represented by the above formula (2), and alkyl amine or an alkylene oxide adduct of alkylene amine represented by the above formula (3).

14. The antistatic composition according to claim 11 or 12, wherein a total (D+E) of the compound (D) and the lithium salt (E) is included at 0.05 to 10.0 parts by weight of 100 parts by weight of the compound (F), the compound (D) being at least one compound selected from the group consisting of alkyl amide or an alkylene oxide adduct of alkylene amide represented by the above formula (2), and alkyl amine or an alkylene oxide adduct of alkylene amine represented by the above formula (3), and the compound (F) being at least one compound selected from the group consisting of polymerizable monomer, prepolymer, oligomer, and polymer.

15. The antistatic composition according to claim 13, wherein a total (D+E) of the compound (D) and the lithium salt (E) is included at 0.05 to 10.0 parts by weight of 100 parts by weight of the compound (F), the compound (D) being at least one compound selected from the group consisting of alkyl amide or an alkylene oxide adduct of alkylene amide represented by the above formula (2), and alkyl amine or an alkylene oxide adduct of alkylene amine represented by the above formula (3), and the compound (F) being at least one compound selected from the group consisting of polymerizable monomer, prepolymer, oligomer, and polymer.

16. A method for producing an antistatic composition, comprising: dissolving a lithium salt (E) in a compound (D) the lithium salt (E) being at least one lithium salt selected from the group consisting of lithium bis (trifluoromethanesulfonyl) imide, lithium tris (trifluoromethanesulfonyl) methide, and trifluoromethanesulfonic acid lithium, and the compound (D) being at least one compound selected from the group consisting of alkyl amide or an alkylene oxide adduct of alkylene amide represented by the following formula (2), and alkyl amine or an alkylene oxide adduct of alkylene amine represented by the following formula (3); and adding the solution in at least one compound (F) selected from the group consisting of polymerizable monomer prepolymer, oligomer, and polymer:

(2)

where R1 represents an alkyl group an alkylene group, or an oxyalkylene group, R2 and R3 represent oxyalkylene groups that may be identical or different, x represents 0 or an integer of 2 to 50, and y represents an integer of 2 to 50; and

(3)

where R1 represents an alkyl group, an alkylene group, or an oxyalkylene group, R2 and R3 represent oxyalkylene groups that may be identical or different, x represents 0 or an integer of 2 to 50, and y represents an integer of 2 to 50.

* * * * *